(12) United States Patent
Nakamura et al.

(10) Patent No.: US 8,947,991 B2
(45) Date of Patent: Feb. 3, 2015

(54) OPTICAL INFORMATION REPRODUCING APPARATUS AND OPTICAL INFORMATION REPRODUCING METHOD

(75) Inventors: Yusuke Nakamura, Tokyo (JP); Hajime Ishihara, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 14/118,080

(22) PCT Filed: Apr. 19, 2012

(86) PCT No.: PCT/JP2012/060631
§ 371 (c)(1),
(2), (4) Date: Nov. 15, 2013

(87) PCT Pub. No.: WO2012/172867
PCT Pub. Date: Dec. 20, 2012

(65) Prior Publication Data
US 2014/0185421 A1    Jul. 3, 2014

(30) Foreign Application Priority Data

Jun. 17, 2011    (JP) .................................. 2011-134723

(51) Int. Cl.
*G11B 7/00*    (2006.01)
*G11B 7/007*    (2006.01)
(Continued)

(52) U.S. Cl.
CPC ............ *G11B 7/00772* (2013.01); *G11B 20/18* (2013.01); *G11B 20/10055* (2013.01); *G11B 20/1012* (2013.01); *G11B 20/10287* (2013.01); *G11B 20/10379* (2013.01); *G11B 2020/185* (2013.01); *G11B 2220/2504* (2013.01)
USPC ........................ 369/103; 369/59.22

(58) Field of Classification Search
None
See application file for complete search history.

(56) References Cited

U.S. PATENT DOCUMENTS

2002/0172131 A1* 11/2002 Burr ............................. 369/103
2005/0240856 A1   10/2005 Hayashi
(Continued)

FOREIGN PATENT DOCUMENTS

JP         11-355151        12/1999
JP         2007-272973 A    10/2007
(Continued)

OTHER PUBLICATIONS

International Search Report, w/ English translation thereof, issued in International Patent Application No. PCT/JP2012/060631 dated May 22, 2012.
(Continued)

*Primary Examiner* — Peter Vincent Agustin
(74) *Attorney, Agent, or Firm* — McDermott Will & Emery LLP

(57) ABSTRACT

A method of calculating a reliability effective in a decoding process of hologram. An optical information reproducing apparatus that reproduces information with the use of the holography includes an image acquisition unit that reproduces two-dimensional data from a hologram disc, an image equalization unit that makes the two-dimensional data equal to target data having a target PR characteristic, a soft output decoding unit that decodes output data of the image equalization unit on the basis of the PR characteristic, and outputs a decoded result having a reliability, and an error correction unit that conducts an error correction of the data on the basis of the decoded result.

6 Claims, 25 Drawing Sheets

(51) Int. Cl.
*G11B 20/18* (2006.01)
*G11B 20/10* (2006.01)

(56) References Cited

U.S. PATENT DOCUMENTS

| | | |
|---|---|---|
| 2006/0238841 A1 | 10/2006 | Anderson et al. |
| 2006/0282753 A1* | 12/2006 | Vasiliev ........................ 714/794 |
| 2006/0285469 A1* | 12/2006 | Tonami ......................... 369/103 |
| 2008/0104486 A1 | 5/2008 | Kanaoka |
| 2008/0192311 A1 | 8/2008 | Horimai |
| 2011/0010601 A1* | 1/2011 | Maeto ........................... 714/752 |
| 2012/0163152 A1* | 6/2012 | Hosaka et al. ................ 369/103 |

FOREIGN PATENT DOCUMENTS

| | | |
|---|---|---|
| JP | 2008112527 A | 5/2008 |
| JP | 2009-048727 A | 3/2009 |
| JP | 2010-140551 A | 6/2010 |

OTHER PUBLICATIONS

Japanese Office Action issued in Japanese Patent Application No. 2011-134723 dated Jan. 21, 2014.

J. Kim et al., "Modified Two-Dimensional Soft Output Viterbl Algorithm for Holographic Data Storage", Japanese Journal of Applied Physics, Aug. 20, 2010, vol. 49, No. 8,08KB03.

Office Action Japanese Patent Application No. 2011-134723 dated Sep. 16, 2014.

* cited by examiner

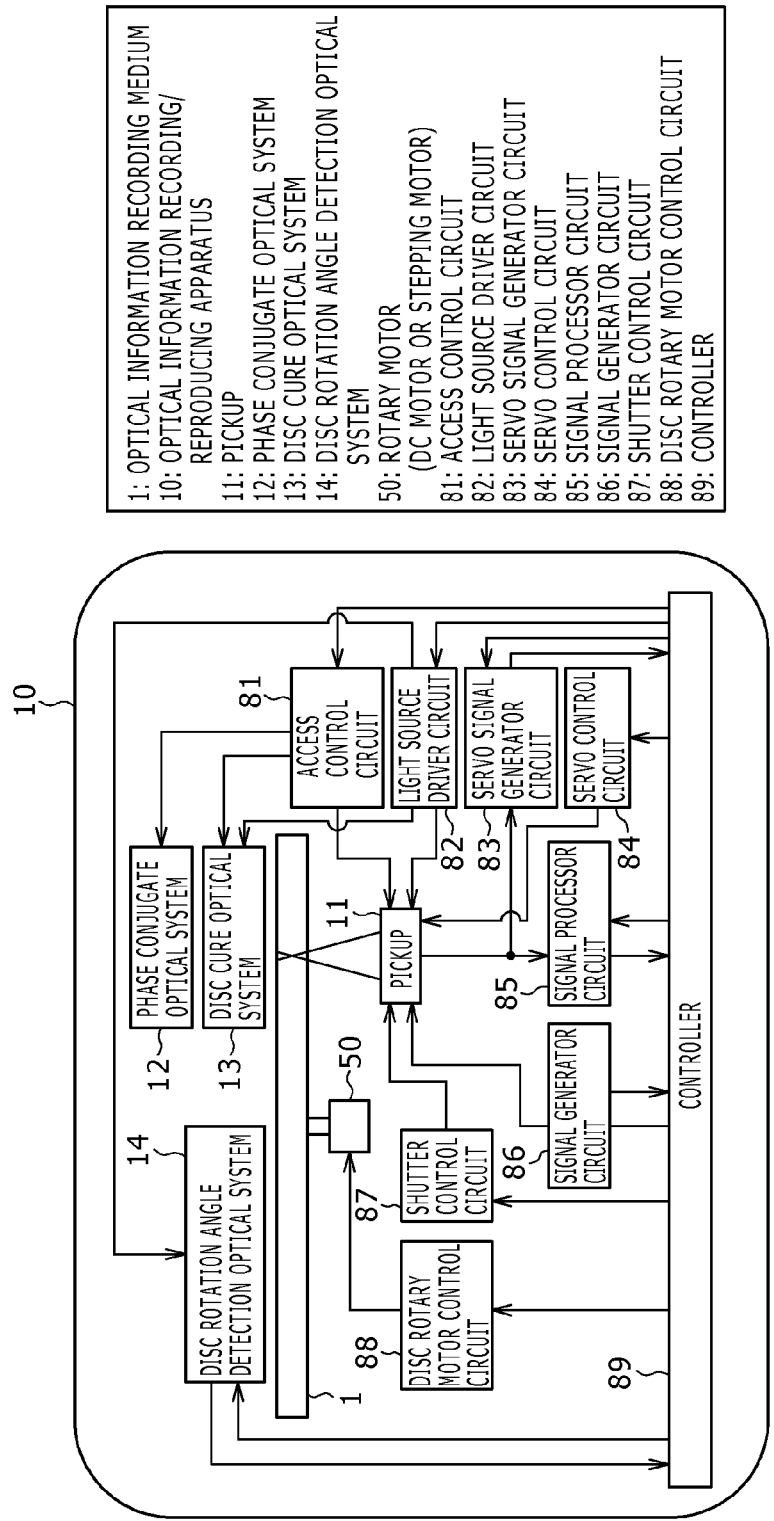

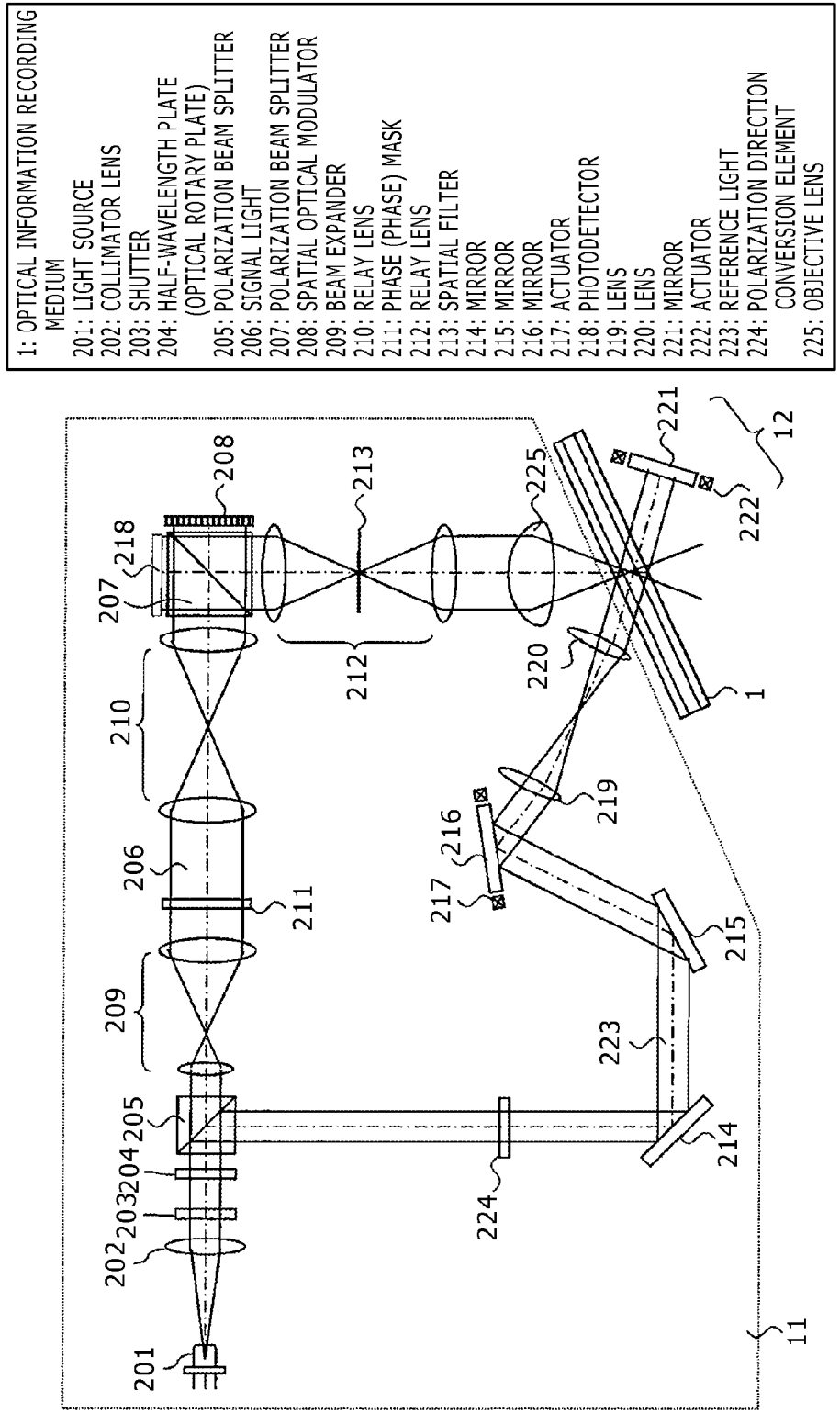

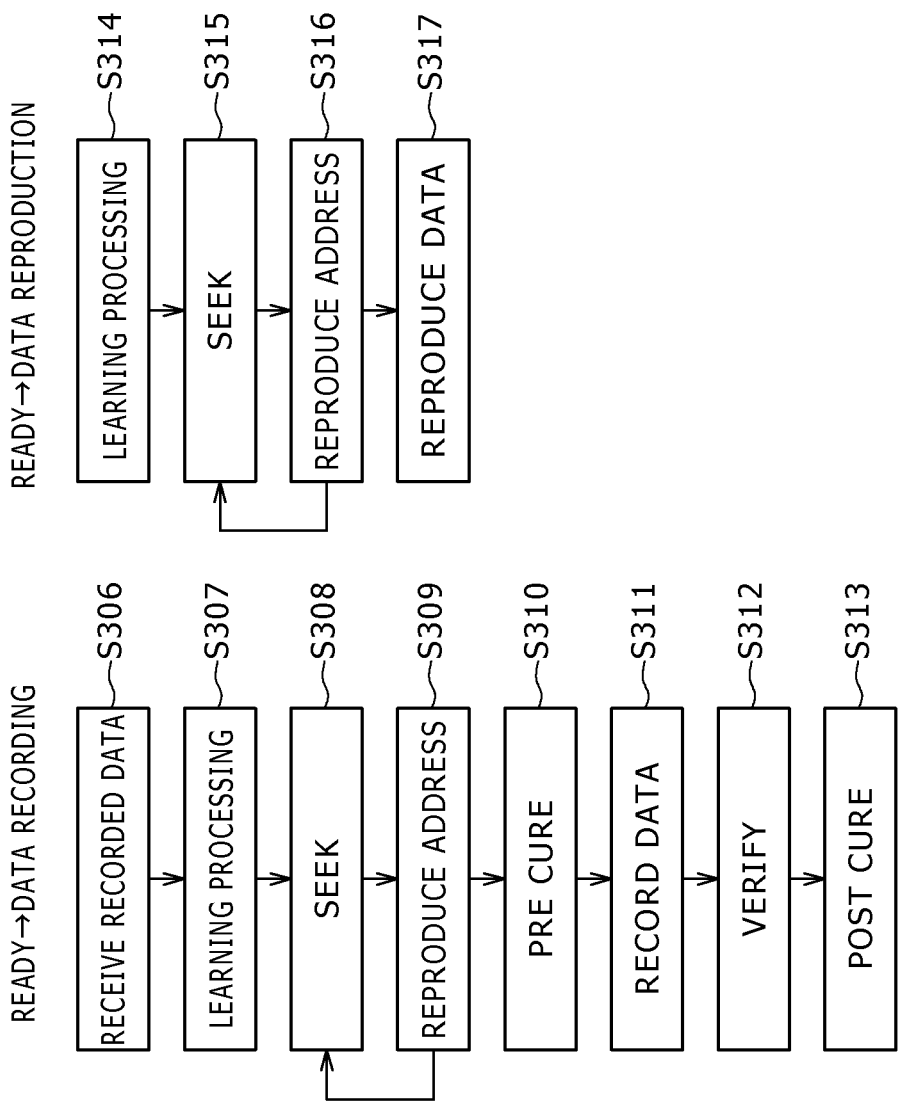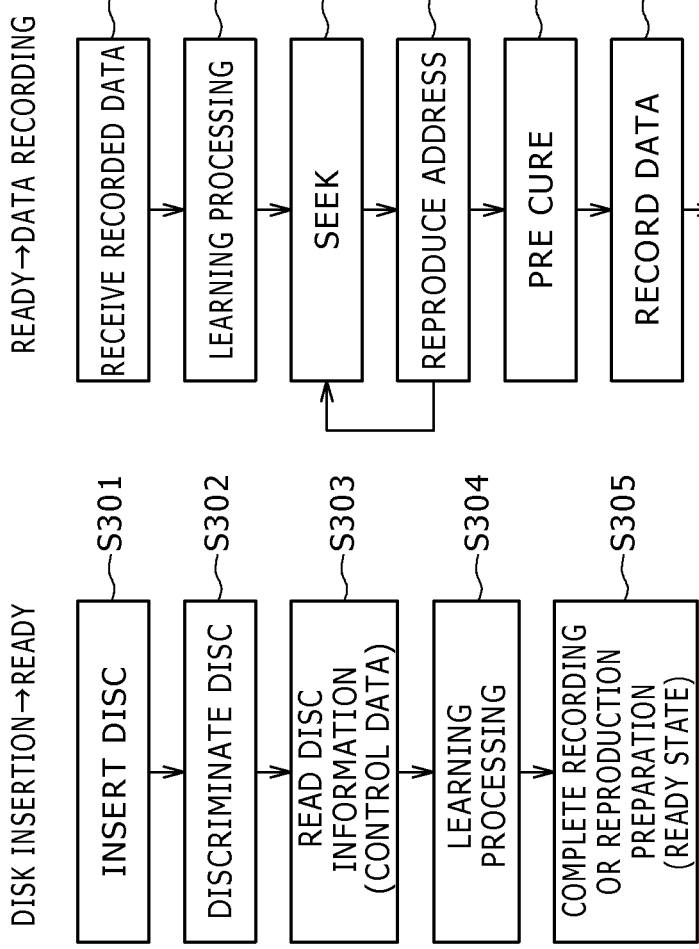

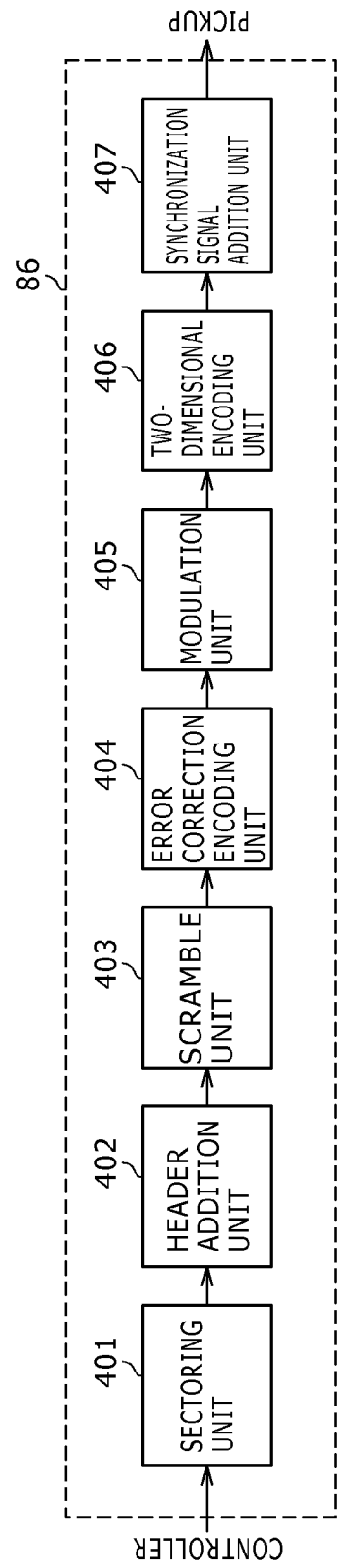

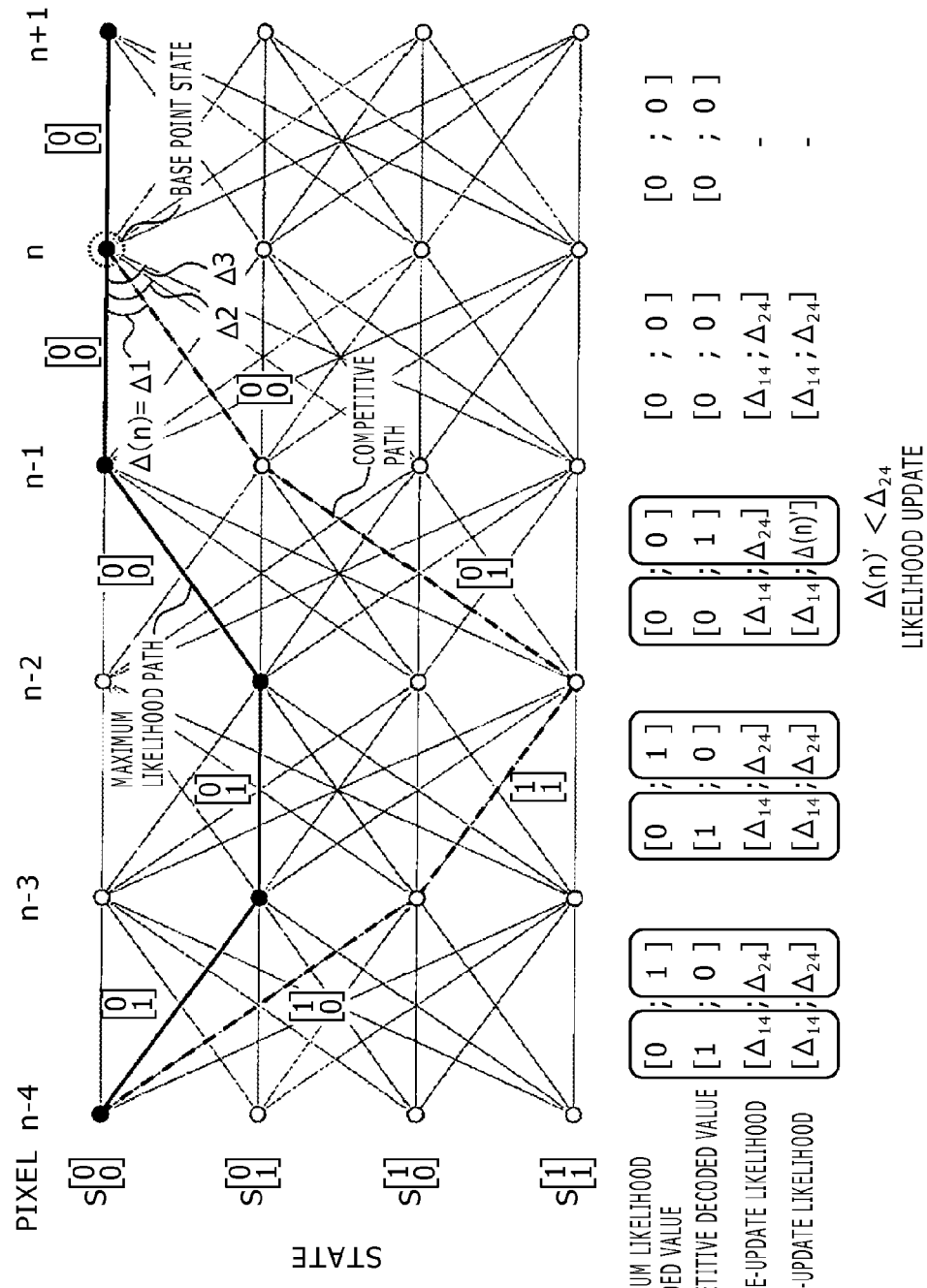

OPTICAL INFORMATION REPRODUCING APPARATUS AND OPTICAL INFORMATION REPRODUCING METHOD

RELATED APPLICATIONS

This application is the U.S. National Phase under 35 U.S.C. §371 of International Application No. PCT/JP2012/060631, filed on Apr. 19, 2012, which in turn claims the benefit of Japanese Application No. 2011-134723, filed on Jun. 17, 2011, the disclosures of which Applications are incorporated by reference herein.

TECHNICAL FIELD

The present invention relates to an apparatus and method for reproducing information from an optical information recording medium with the use of holography.

BACKGROUND ART

At the moment, optical discs having a recording density of about 50 GB can be commercialized only for domestic civil use by a blue-ray disc (BD) standard or a high definition digital versatile disc (HD DVD) standard using a blue-violet semiconductor layer.

In the future, a large capacity of the same degree as an HDD (hard disc drive) capacity such as 100 GB to 1 TB is put in practical use even in an optical disc.

However, in order to realize such an ultrahigh density in the optical disc, a novel storage technique is required which is different from the trend of a conventional high density technique with the provision of shorter wavelengths and higher objective lens NA up to now.

There is a hologram recording technique for recording digital information by using holography through the study of a next-generation storage technique.

The hologram recording technique is disclosed in, for example, Japanese Unexamined Patent Application Publication No. 2004-272268 (Patent Literature 1). This publication discloses a so-called angle-multiplexing recording system in which a signal optical beam is focused on an optical information recording medium by a lens while a reference light of a parallel optical beam is applied and interferes with the signal optical beam to conduct a hologram record, and further different page data is displayed in a spatial light modulator while changing an incident angle to an optical recording medium of the reference light to conduct multiple recording. Further, this publication discloses a technique in which a signal light is focused by the lens, and an opening (spatial filter) is arranged in a beam waist of the signal light, as a result of which an interval of adjacent holograms can be shortened, and recording density and capacity are increased as compared with the conventional angle-multiplexing recording system.

Also, the hologram recording technique is disclosed in, for example, WO2004-102542 (Patent Literature 2). This publication discloses an example using a shift multiplex system in which a light from a pixel inside of one spatial optical modulator is set as the signal light, and a light from an orbicular zonal pixel outside thereof is set as the reference light, both of those optical beams are focused on the optical recording medium by the same lens, and the signal light and the reference light are allowed to interfere with each other in the vicinity of a focal plane of the lens to record the hologram.

A method of reproducing the hologram described above is disclosed in, for example, Japanese Unexamined Patent Application Publication No. 2009-488727 (Patent Literature 3). This publication discloses the reproducing method in which there is provided a two-dimensional Viterbi decoding circuit that calculates a path metric on the basis of a transition of a trellis state of plural rows including a row to be decoded in a two-dimensional reproduced signal of two-dimensionally modulated page data to conduct Viterbi decoding, and the two-dimensional Viterbi decoding circuit removes the transition of the trellis state on the basis of a bit pattern indicative of the transition of the trellis state of the plural rows including the row to be decoded, and a pattern of the two-dimensional modulation to conduct the Viterbi decoding.

CITATION LIST

Patent Literature

[Patent Literature 1] Japanese Unexamined Patent Application Publication No. 2004-272268
[Patent Literature 2] Japanese Unexamined Patent Application Publication No. WO2004-102542
[Patent Literature 3] Japanese Unexamined Patent Application Publication No. 2009-48727

SUMMARY OF INVENTION

Technical Problem

The decoding method disclosed in Patent Literature 3 is effective in reproduction of the hologram recorded in the optical recording medium in the method disclosed in Patent Literature 1 or Patent Literature 2. However, its output value is a binary value of 0 and 1, and reliability necessary to use soft-decision decoding or the like cannot be obtained.

Under the circumstances, an object of the present invention is to provide a method of calculating an effective reliability in a decoding process of the hologram.

Solution to Problem

The above problem is solved by the claimed invention. As an example, according to the present invention, there is provided an optical information reproducing apparatus that reproduces information with the use of holography, including an image acquisition unit that reproduces two-dimensional data from a hologram disc; an image equalization unit that makes the two-dimensional data equal to target data having a target PR characteristic; a soft output decoding unit that decodes output data of the image equalization unit on the basis of the PR characteristic, and outputs a decoded result having a reliability; and an error correction unit that conducts an error correction of the data on the basis of the decoded result.

Advantageous Effects of Invention

According to the present invention, the reliability effect in the decoding process of the hologram can be calculated, and a correction capability can be improved by application of the soft-decision decoding.

BRIEF DESCRIPTION OF DRAWINGS

FIG. 1 is a configuration diagram of optical information recording/reproducing means according to a first embodiment of the present invention.

FIG. 2 is a configuration diagram of pickup according to the first embodiment of the present invention.

FIG. 3 is a flowchart illustrating an operation procedure according to the first embodiment of the present invention.

FIG. 4 is a configuration diagram of signal generating means according to the first embodiment of the present invention.

FIG. 27 is a trellis diagram illustrating soft output decoding according to a fifth embodiment of the present invention.

DESCRIPTION OF EMBODIMENTS

Figure 5:
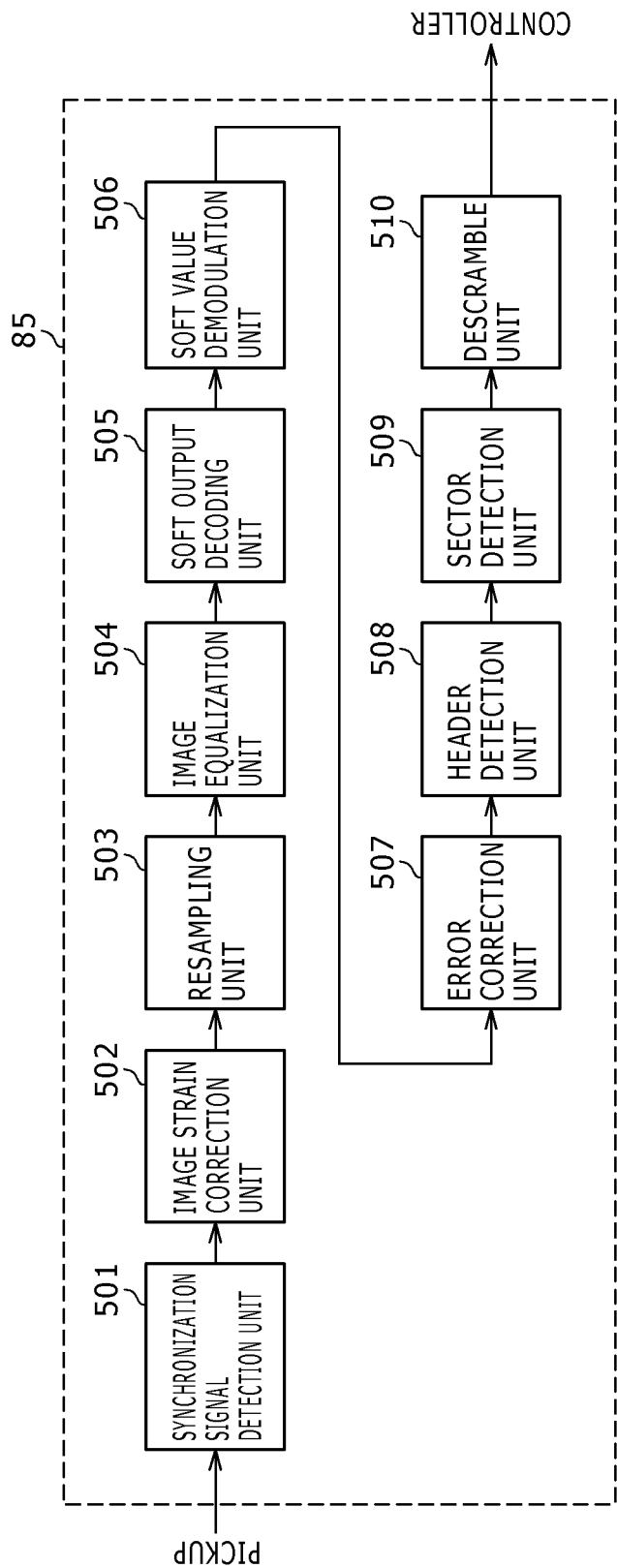
FIG. 5 is a configuration diagram of signal processing means according to the first embodiment of the present invention.

Hereinafter, embodiments of the present invention will be described.

First Embodiment

FIG. 1 illustrates an overall configuration of an optical information recording/reproducing apparatus that records and/or reproduces digital information with the use of holography.

An optical information recording/reproducing apparatus 10 includes a pickup 11, a phase conjugate optical system 12, a disc cure optical system 13, a disc rotation angle detection optical system 14, and a rotary motor 50. An optical information recording medium 1 is configured to be rotatable by the rotary motor 50.

The pickup 11 emits a reference light and a signal light to the optical information recording medium 1, and records digital information with the use of holography.

In this situation, an information signal to be recorded is sent to a spatial optical modulator, which will be described later, within the pickup 11 through a signal generator circuit 86 by a controller 89. The signal light is modulated by the spatial optical modulator.

When information recorded on the optical information recording medium 1 is reproduced, a phase conjugate beam of the reference light emitted from the pickup 11 is generated by the phase conjugate optical system 12. In this example, the phase conjugate beam represents a light wave that travels in an opposite direction while keeping the same wave front as that of an input light. A reproduced light that is reproduced by the phase conjugate beam is detected by a photodetector, which will be described later, within the pickup 11, and the signal is reproduced by a signal processor circuit 85.

An irradiation time of the reference light and the signal light with which the optical information recording medium 1 is irradiated can be adjusted by controlling an open/close time of a shutter, which will be described later, within the pickup 11 by the controller 89 through a shutter control circuit 87.

The disc cure optical system 13 functions to generate an optical beam used in precure and postcure of the optical information recording medium 1. In this example, the precure represents a pre-process for applying a given optical beam in advance before applying the reference light and the signal light at a desired position, in recording information at the desired position within the optical information recording medium 1. Also, the postcure represents a post-process for applying a given optical beam for disabling append at a desired position, after recording information at the desired position within the optical information recording medium 1.

The disc rotation angle detection optical system 14 is used to detect a rotation angle of the optical information recording medium 1. When the optical information recording medium 1 is adjusted to a desired rotation angle, a signal corresponding to the rotation angle is detected by the disc rotation angle detection optical system 14, and the rotation angle of the optical information recording medium 1 can be controlled by the controller 89 through a disc rotary motor control circuit 88 with the use of the detected signal.

A given light source drive current is supplied from a light source driver circuit 82 to light sources within the pickup 11, the disc cure optical system 13, and the disc rotation angle detection optical system 14, and optical beams each having a given light quantity can be emitted from the respective light sources.

Also, the pickup 11, the phase conjugate optical system 12, and the disc cure optical system 13 are each equipped with a mechanism in which their positions can be slid in a radial direction of the optical information recording medium 1, and a position control is conducted through an access control circuit 81.

Incidentally, the recording technique using the holography is a technique capable of recording ultrahigh density information. Therefore, for example, an allowable error of an inclination or a positional displacement of the optical information recording medium 1 has a tendency to become extremely small. For that reason, a mechanism in which, for example, a displacement amount of a displacement factor small in the allowable error such as an inclination or a positional displacement of the optical information recording medium 1 is detected may be disposed within the pickup 11, a servo control signal may be generated by a servo signal generator circuit 83, and a servo mechanism for correcting the displacement amount through a servo control circuit 84 may be disposed within the optical information recording/reproducing apparatus 10.

Also, several optical system configurations or all of optical system configurations of the pickup 11, the phase conjugate optical system 12, the disc cure optical system 13, and the disc rotation angle detection optical system 14 may be brought together into one piece for simplification.

FIG. 2 illustrates an example of the optical system configuration of the pickup 11 in the optical information recording/reproducing apparatus 10. An optical beam emitted from a light source 201 is transmitted through a collimator lens 202, and input to a shutter 203. When the shutter 203 is opened, after the optical beam has passed through the shutter 203, a polarization direction of the optical beam is controlled by an optical element 204 configured by, for example, a half-wavelength plate so that a light intensity ratio of a p-polarized light and an s-polarized light becomes a desired ratio, and thereafter input to a PBS (polarization beam splitter) prism 205.

After an optical beam diameter of the optical beam that has been transmitted through the PBS prism 205 has been expanded by a beam expander 209, the optical beam is transmitted through a phase mask 211, a relay lens 210, and a PBS prism 207, and input to a spatial optical modulator 208.

A signal optical beam that has been added with information by the spatial optical modulator 208 is reflected by the PBS prism 207, and travels through a relay lens 212 and a spatial filter 213. Thereafter, the signal optical beam is focused on the optical information recording medium 1 by an objective lens 225.

On the other hand, the optical beam that has been reflected by the PBS prism 205 functions as a reference light beam, and is set in a given polarization direction according to a recording time or a reproduction time by a polarization direction conversion element 224. Thereafter, the optical beam is input to a galvanometer mirror 216 through a mirror 214 and a mirror 215. Because an angle of the galvanometer mirror 216 can be adjusted by an actuator 217, an incident angle of the reference optical beam that has passed through lenses 219 and 220 to be input to the optical information recording medium 1 can be set to a desired angle.

Thus, the signal optical beam and the reference optical beam are input to the optical information recording medium 1 so as to overlap with each other, as a result of which an interference fringe pattern is formed within the recording medium, and this pattern is written into the recording medium to record information. Also, because the incident angle of the reference optical beam which is input to the optical information recording medium 1 can be changed by the galvanometer mirror 216, angle-multiplexing recording is enabled.

When the recorded information is reproduced, the reference optical beam is input to the optical information recording medium 1 as described above, the optical beam that has been transmitted through the optical information recording medium 1 is reflected by a galvanometer mirror 221 to generate the phase conjugate beam.

The reproduced optical beam that has been reproduced by the phase conjugate beam travels through the objective lens 225, the relay lens 212, and the spatial filter 213. Thereafter, the reproduced optical beam is transmitted through the PBS prism 207, and input to a photodetector 218 to enable the recorded signal to be reproduced. The optical system configuration of the pickup 11 is not limited to FIG. 2.

FIG. 3 illustrates an operation flow of recording and reproduction in the optical information recording/reproducing apparatus 10. FIG. 3A illustrates an operation flow since the optical information recording medium 1 is inserted into the optical information recording/reproducing apparatus 10 until the preparation of recording or reproduction is completed. FIG. 3B illustrates an operation flow until information is recorded into the optical information recording medium 1 from a preparation completion state, and FIG. 3C illustrates an operation flow until the information recorded into the optical information recording medium 1 is reproduced from a preparation completion state.

When the medium is inserted as illustrated in FIG. 3A (S301), the optical information recording/reproducing apparatus 10 conducts disc discrimination, for example, as to whether the inserted medium is a medium on which digital information is recorded or reproduced with the use of holography, or not (S302).

As a result, if it is determined that the inserted medium is the optical information recording medium for recording or reproducing the digital information with the use of the holography, the optical information recording/reproducing apparatus 10 reads control data provided in the optical information recording medium, and acquires, for example, information on the optical information recording medium, and information on a variety of setting conditions, for example, at the time of recording or reproduction (S303).

After reading the control data, the optical information recording/reproducing apparatus 10 conducts a variety of adjustments corresponding to the control data, and learning processing pertaining to the pickup 11 (S304), and the optical information recording/reproducing apparatus 10 completes the preparation of recording or reproduction (S305).

In the operation flow until the information is recorded from the standby completion state, as illustrated in FIG. 3B, the optical information recording/reproducing apparatus 10 first receives data to be recorded, and sends information corresponding to the data to a spatial optical modulator within the pickup 11 (S306).

Thereafter, the optical information recording/reproducing apparatus 10 conducts a variety of learning processing in advance as occasion demands, so as to record high-quality information on the optical information recording medium (S307), and arranges positions of the pickup 11 and the disc cure optical system 13 at given positions of the optical information recording medium while repeating seek operation (S308) and address reproduction (S309).

Thereafter, the optical information recording/reproducing apparatus 10 precures a given area with the use of the optical beam emitted from the disc cure optical system 13 (S310), and records data with the use of the reference light and the signal light which are emitted from the pickup 11 (S311).

After recording the data, the optical information recording/reproducing apparatus 10 verifies the data as occasion demands (S312), and conducts postcure with the use of the optical beam emitted from the disc cure optical system 13 (S313).

In the operation flow until the recorded information is reproduced from the preparation completion state, as illustrated in FIG. 3C, the optical information recording/reproducing apparatus 10 conducts the various learning processing in advance as occasion demands, so as to reproduce the high-quality information from the optical information recording medium (S314). Thereafter, the optical information recording/reproducing apparatus 10 arranges the positions of the pickup 11 and the phase conjugate optical system 12 at given positions of the optical information recording medium while repeating seek operation (S308) and address reproduction (S309). Thereafter, the optical information recording/reproducing apparatus 10 emits the reference light from the pickup 11, and reads the information recorded on the optical information recording medium (S317).

Signal generation processing of the signal generator circuit 86 in the optical information recording/reproducing apparatus according to this embodiment will be described in detail with reference to FIG. 4.

The optical information recording/reproducing apparatus 10 receives user data from the controller 89, divides the data for each given data quantity unit by a sectoring unit 401, and adds information such as sector information and an address for each sector by a header addition unit 402. A scramble unit 403 subjects the user data other than the information added by the header addition unit 402 to scrambling. The scrambling is conducted to prevent a sequence of "0" and "1" of data to prevent the same pattern from being continuous. However, this scrambling is not always necessary. Subsequently, an error correction encoding unit 404 executes error correction encoding by an LDPC (low density parity check) code, and a modulation unit 405 executes processing for modulating 2-bit data into 3-bit data according to (1, 7) RLL modulation system used in, for example, BD. The (1, 7) RLL modulation system represents a modulation system that modulates data according to a run length limitation of an RLL (1, 7) having the number of continuous 0 in the modulated bits which is one at a minimum, and seven at a maximum. In this example, for facilitation of the description, one-dimensional modulation is exemplified. However, the modulation is not limited to RLL, but the modulation may be applied to not only one-dimensional direction but also two-dimensional direction. A two-dimensional encoding unit 406 two-dimensionally rearranges the modulated data to configure two-dimensional data for one page, and a synchronization signal addition unit 407 adds a marker acting as a standard at the time of reproduction, and a header serving as page information to the data, and transmits the data to the pickup 11.

Subsequently, reproduced signal processing of the signal processor circuit 85 in the optical information recording/reproducing apparatus according to this embodiment will be described in detail with reference to FIG. 5.

The signal processor circuit 85 receives two-dimensional reproduced data from the pickup 11, detects an image position on the basis of the marker of an image by a synchronization signal detection unit 501, and corrects a strain such as an inclination, magnification, or distortion of the image by an image strain correction unit 502. Also, since a resolution of the photodetector 218 is higher than a resolution of the spatial optical modulator 208 generally used in recording, recorded two-dimensional data is oversampled in the two-dimensional reproduced data acquired by the pickup 11. Hence, down sampling is mainly implemented by a resampling unit 503 with the use of a two-dimensional FIR filter. The strain correction by the resampling unit 503 and the down sampling by the resampling unit 503 may be implemented at the same time. An image equalization unit 504 equalizes the resampled two-dimensional data to a PR characteristic suitable for processing in a downstream soft output decoding unit 505. The equalization is implemented by a two-dimensional FIR filter, and a filter coefficient can be calculated with the use of an adaptable algorithm such as a linear minimum mean squared error (LMMSE) method. The LMMSE represents algorithm for calculating a filter coefficient in which a mean value of a squared error between the equalized signal and an ideal signal is minimized as disclosed in Non-patent Literature "Japanese Journal of Applied Physics Vol. 45, No. 2B, 2006, PP. 1079-1083". The LMMSE is exemplified, but the present invention is not limited to this example, but other algorithms may be applied. Also, since the PR characteristic is provided for the two-dimensional data, it is preferable that a two-dimensional PR characteristic is provided. However, for facilitation of the description, the following description is given in only one-dimensional direction such as PR (1, 2, 2, 2, 1). The soft output decoding unit 505 obtains a soft output decoded value through a method which will be described later. A soft value demodulation unit 506 demodulates (1, 7) RLL modulation as the soft output demodulated value by the soft output decoding unit 505, and an error correction unit 507 implements an error correction of an LDPC code by sum-product decode. Thereafter, a header detection unit 508 reads information such as the sector information or the address, a sector detection unit 509 divides data for each sector on the basis of that information, and a descramble unit 510 cancels the scrambling, and transmits the data to the controller 89.

In this example, a concept of the soft output decoding unit 505 will be described with reference to FIGS. 22 to 25, 6, and 7.

Figure 22:
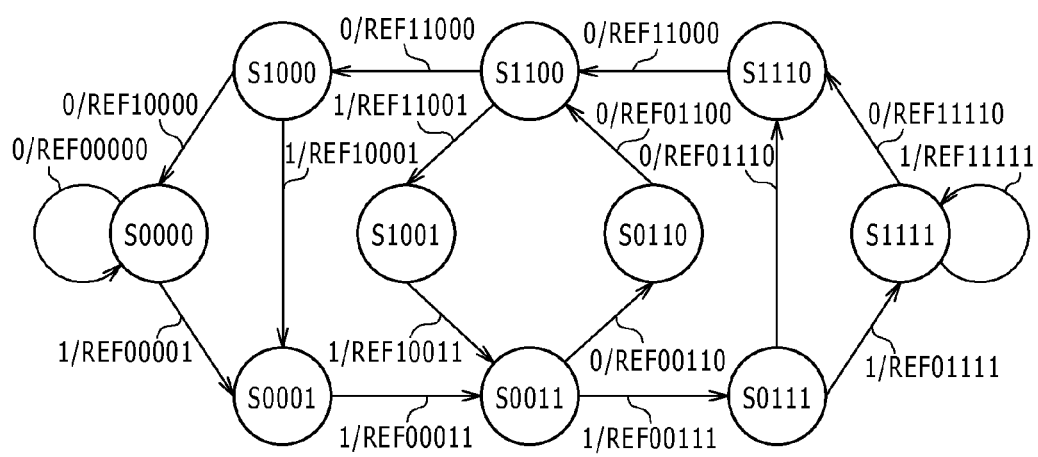
FIG. 22 is a state transition diagram of a Viterbi algorithm using PR (1, 2, 2, 2, 1).
Figure 23:
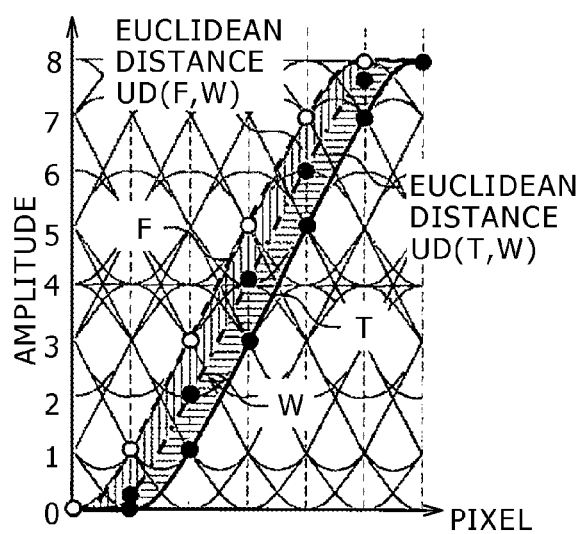
FIG. 23 is a diagram illustrating an example of a maximum likelihood waveform, an error waveform, and a reproduced waveform.

A base of the soft output decoding unit 505 is a Viterbi decoding, and the PR characteristic called "PR(1, 2, 2, 2, 1)" is used in, for example, BDXL (trademark). As illustrated in FIG. 22, the soft output decoding unit 505 conducts decoding by a state transition that reflects the (1, 7) RLL modulation. It is assumed that a difference (Ex. 3) between a Euclidean distance (Ex. 1) between the maximum likelihood waveform (T in FIG. 23) in the Viterbi decoding and an image equalization unit 504 output waveform (W in FIG. 23), and a Euclidean distance (Ex. 2) between the error waveform (F in FIG. 23) and the image equalization unit 504 output waveform is a likelihood Δ. Symbols $t_n$, $f_n$ and w, represent amplitude values of T, F, and W in an n-th pixel.

$$ED(T, W) = \sum_n (t_n - w_n)^2 \qquad [\text{Ex. 1}]$$

$$ED(F, W) = \sum_n (f_n - w_n)^2 \qquad [\text{Ex. 2}]$$

$$\Delta = ED(F, W) - ED(T, W) \qquad [\text{Ex. 3}]$$

Also, since the Sum-product decoding in the error correction unit 507 is a decoding method of a log domain, a reliability that is the soft output decoding unit 505 output needs to be set as a log likelihood ratio (LLR). This LLR can be approximated by Ex. 4 if a probability density function of the likelihood Δ is close to a normal distribution. μ represents a mean value of the distribution, and σ is a standard deviation.

$$LLR = \frac{2 \cdot \mu}{\sigma^2} \cdot \Delta \qquad [\text{Ex. 4}]$$

Figure 24:
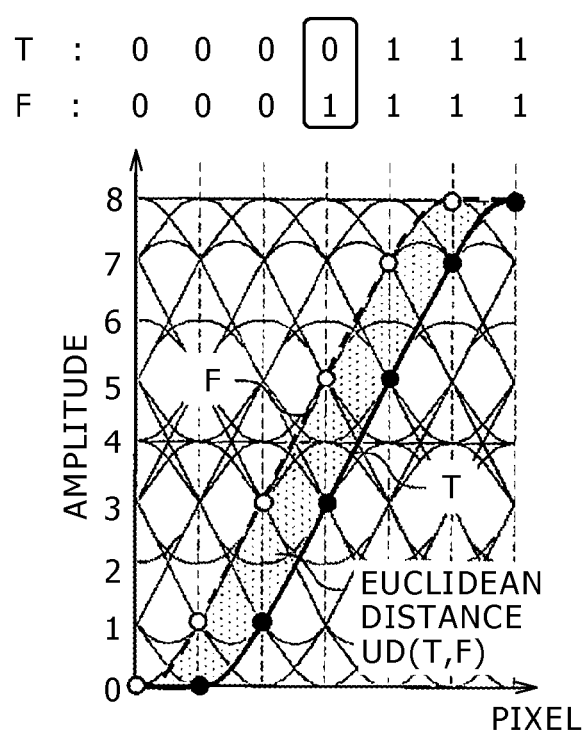
FIG. 24 is a diagram illustrating an example of the maximum likelihood waveform and the error waveform.
Figure 25:
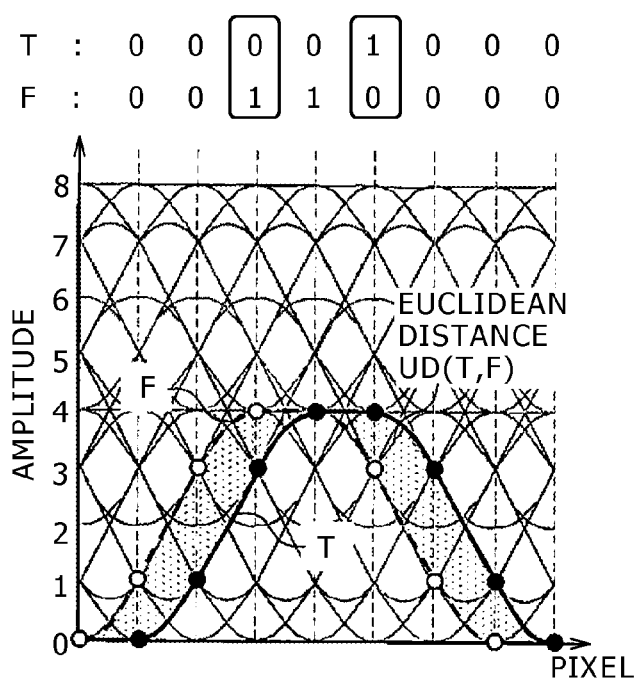
FIG. 25 is a diagram illustrating an example of the maximum likelihood waveform and the error waveform.

In a process of the reliability calculation, in the data subjected to (1, 7) RLL modulation, there arises such a problem that decoded values of T and F are patterns that can exist actually, that is, a shortest run length is 2T, and the presence of 1T is not allowed. For example, in FIG. 24, the decoded value of T is [0000111], the decoded value of F is [0001111], and the number of error bits is 1. In FIG. 25, the decoded value of T is [00011000], the decoded value of F is [00110000], and the number of error bits is 2. This is attributable to a fact that a 2T portion slips without allowing 1T shift when T in FIG. 25 is in error because the Viterbi algorithm operates so as to satisfy a rule of the RLL modulation. For that reason, in the RLL modulated data, the Euclidean distance (Ex. 5) between T and F is changed by a decoding result.

$$ED(F, T) = \sum_n (f_n - t_n)^2 \qquad [\text{Ex. 5}]$$

Figure 6:
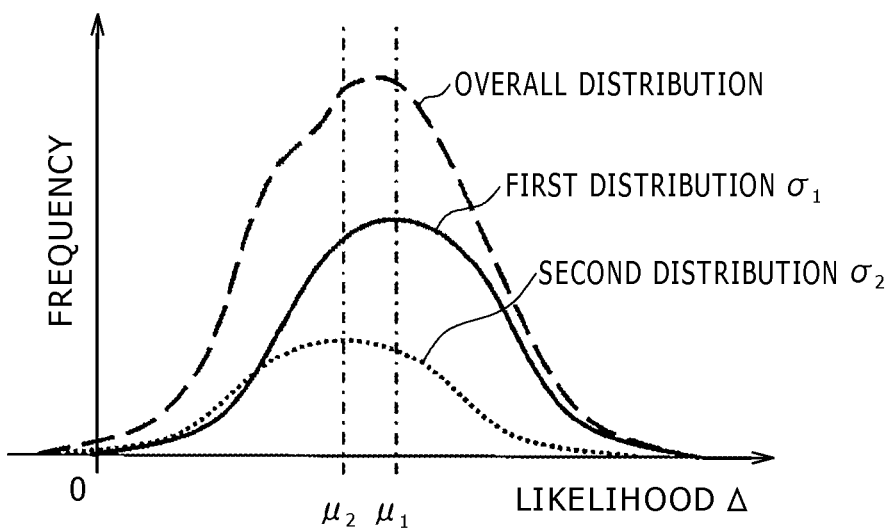
FIG. 6 is a diagram illustrating likelihood distributions of respective patterns, and a likelihood distribution combining those likelihood distributions together.

This influence will be described with reference to FIG. 6. FIG. 6 illustrates an image in which the likelihood Δ of a PLL modulated data string is expressed by histogram with the axis of abscissa as the likelihood Δ and the axis of ordinate as the occurrence of frequency. A distribution of a pattern in FIG. 24 is set as a first distribution, and a distribution of a pattern in FIG. 25 is set as a second distribution. In the respective distributions, according to a normal distribution, a mean value μ of the distribution is obtained when W=T is satisfied, and represented by Expression 6.

$$\mu = \Delta(W=T) = UD(F,T) \qquad [\text{Ex. 6}]$$

This value is different between the first distribution and the second distribution since the Euclidean distance of T and F is different according to the pattern, as a result of which a combined overall distribution deviates from the normal distribution. This makes it difficult to apply an LLR calculation expression represented by Expression 4.

Under the circumstances, in order to solve this problem, this embodiment is characterized in that the likelihood Δ is normalized by the Euclidean distance of T and F as represented by Expression 7.

$$\Delta' = \frac{\Delta}{ED(F, T)} \qquad [\text{Ex. 7}]$$

Figure 7:
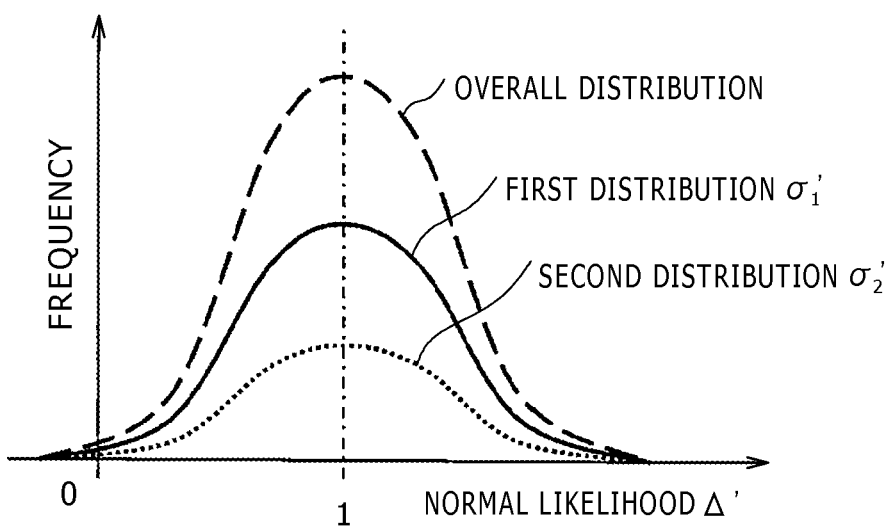
FIG. 7 is a diagram illustrating normalized distributions of respective patterns, and a normalized likelihood distribution combining those likelihood distributions together.

FIG. 7 illustrates an image in which the normalized likelihood Δ' is expressed by histogram as the occurrence of frequency. With the use of the normalized likelihood, the average values match each other, and the overall distribution also comes closer to the normal distribution, as a result of which the LLR can be correctly calculated.

Figure 8:
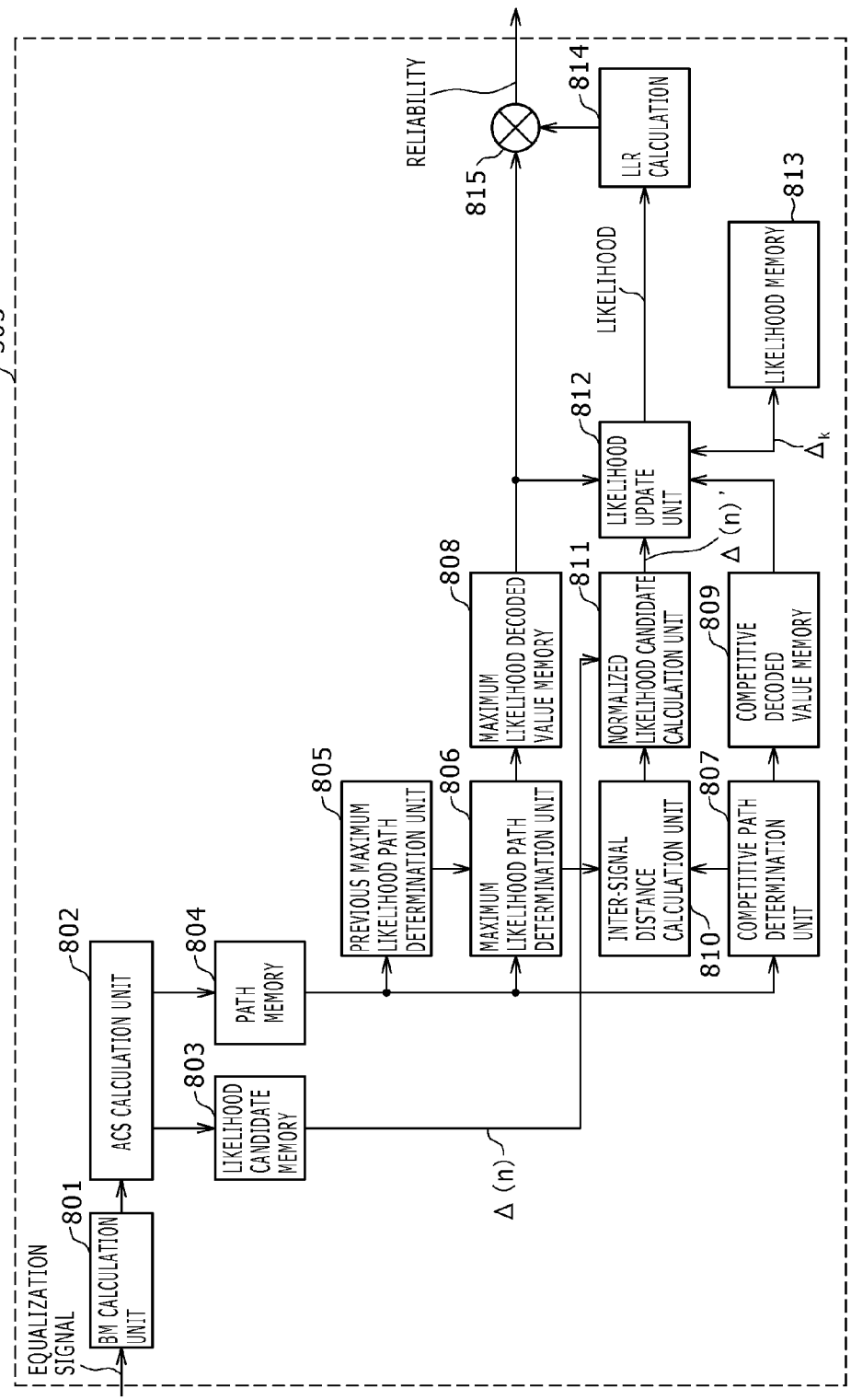
FIG. 8 is a configuration diagram of soft output decoding means according to the first embodiment of the present invention.

The details of the soft output decoding unit 505 using this concept will be described below with reference to FIGS. 8 to 12. First, FIG. 8 illustrates a configuration of the soft output decoding unit 505. The PR characteristic to be used will be described as PR (1, 2, 2, 2, 1), but is not limited to this configuration.

First, a BM calculation unit 801 calculates a branch metric which is a square of a difference between reference values REF00000 to REF11111 in FIG. 22 and an equalized waveform which is an input of the soft output decoding unit 505. Thereafter, an ACS calculation unit 802 adds the branch metric to a path metric for each of states S0000 to S1111 in FIG. 22, and compares addition results with each other at a point where the paths of FIG. 22 join together to select a smaller path. The ACS calculation unit 802 stores an addition result difference of those two joining paths in a likelihood candidate memory 803 as a likelihood candidate Δ. Also, the ACS calculation unit 802 stores a path selection result of the ACS calculation unit 802 in a path memory 804.

Figure 9:
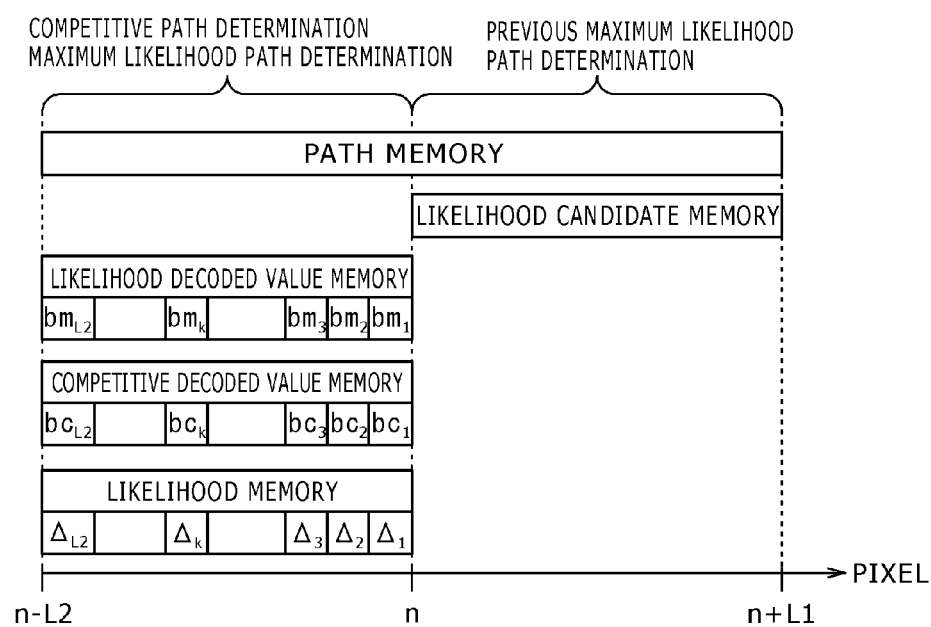
FIG. 9 is a configuration diagram of a memory according to the first embodiment of the present invention.

If the maximum likelihood path is uncertain when calculating the likelihood, the reliability of the likelihood, the reliability of the likelihood also decreases. Therefore, after the maximum likelihood path is determined, the maximum likelihood path for calculation of the likelihood and the competitive path are determined with the determination result as the base point. A previous maximum likelihood path determination unit 805 implements this first maximum likelihood path determination, a maximum likelihood path determination unit 806 implements the maximum likelihood path determination with the determination result as the base point, and a competitive path determination unit 807 implements the competitive path determination. A configuration of the path memory 804 and the likelihood candidate memory 803 when a path memory length of the previous maximum likelihood path determination is L1, and a path memory length of the maximum likelihood path determination is L2 is illustrated in FIG. 9. The axis of abscissa represents a pixel, and an n-th pixel is the base point. FIG. 9 also illustrates an example of a maximum likelihood decoded value memory 808, a competitive decoded value memory 809, and a likelihood memory 813.

Figure 10:
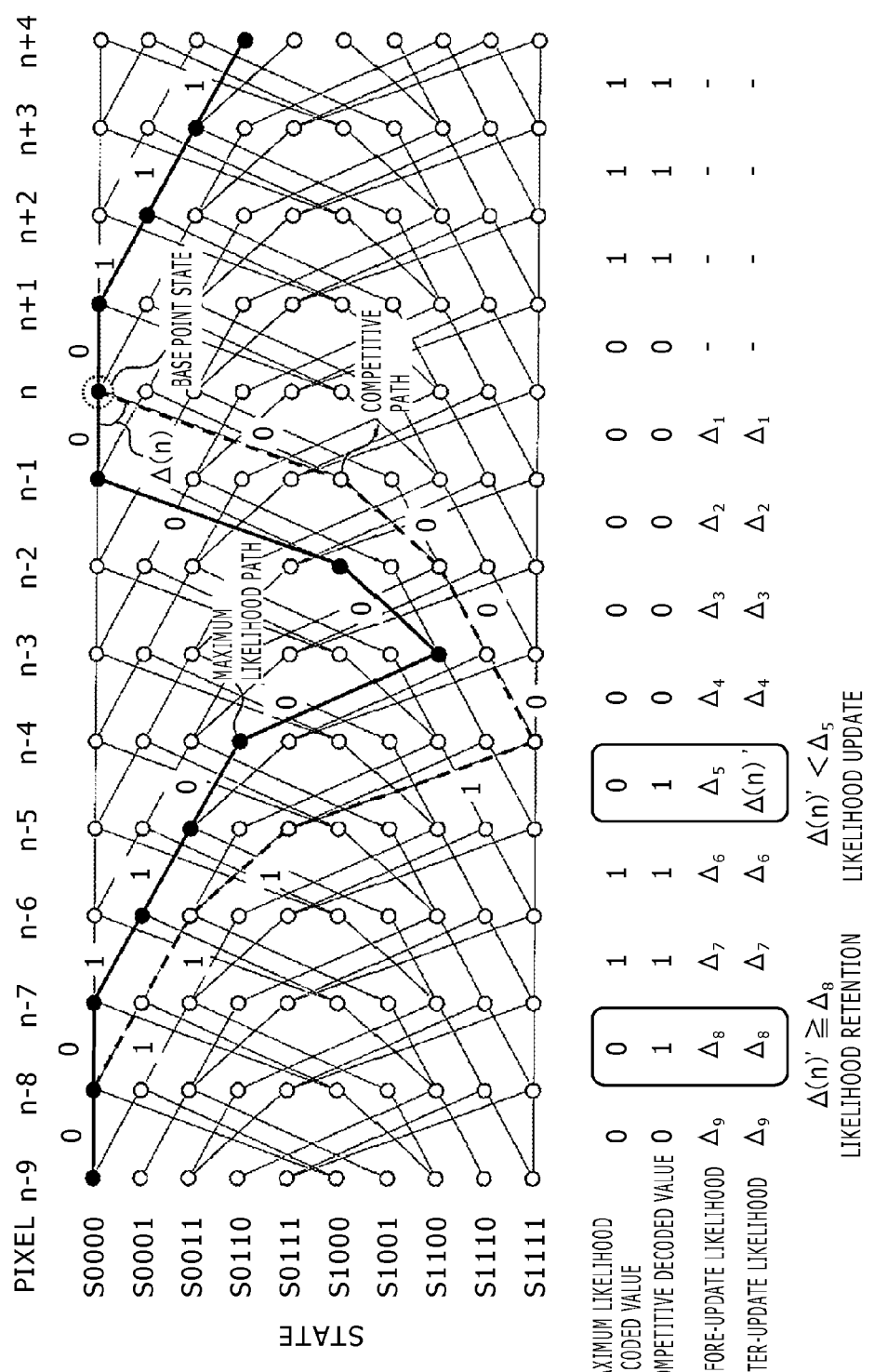
FIG. 10 is a trellis diagram illustrating soft output decoding according to the first embodiment of the present invention.

An example of an n-th pixel periphery in the path determination method will be described with reference to FIG. 10. A trellis diagram of FIG. 10 develops a state transition diagram of FIG. 22. First, in the previous maximum likelihood path determination unit 805, a path selection result of the path memory 804 is traced back from an (n+L1)-th pixel to an n-th pixel to determine the maximum likelihood path. It is assumed that a state of the n-th pixel is a base point state. Then, in the maximum likelihood path determination unit 806, the n-th pixel to an (n−L2)-th pixel are traced back as usual to determine the maximum likelihood path with the base point state of the n-th pixel as a start point. Also, in the competitive path determination unit 807, a path different from the path stored in the path memory 804 for only the transition to the (n−1)-th pixel is selected with the base point state of the n-th pixel as the start point, and thereafter the (n−1)-th pixel to the (n−L2)-th pixel are traced back as usual to determine the competitive path. If the number of paths connected to the state which is the base point is only one, the base point state is transitioned from the n-th pixel to the (n−1)-th pixel, and a path different from the path stored in the path memory 804 only for the transition to the (n−2)-th pixel is selected. Likewise, it is assumed to go back to a time when the number of paths connected to the state which is the base point is not one. The decoded result by the maximum likelihood path in the maximum likelihood path determination unit 806 is stored in the maximum likelihood decoded value memory 808, and the decoded result by the maximum likelihood path in the competitive path determination unit 807 is stored in the competitive decoded value memory 809.

Figure 11:
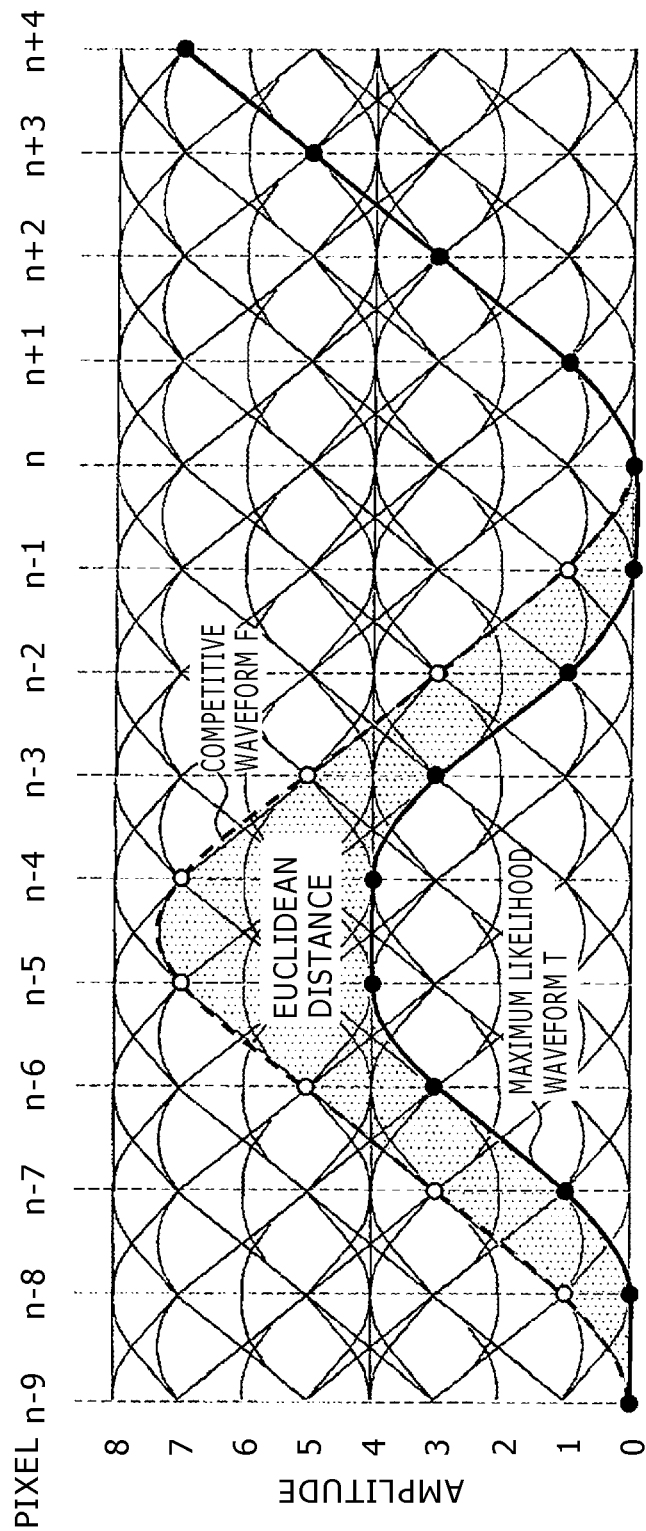
FIG. 11 is a waveform diagram illustrating the soft output decoding according to the first embodiment of the present invention.

In this embodiment, as described above, there is a need to normalize the likelihood by the Euclidean distance of the maximum likelihood waveform and the competitive waveform. FIG. 11 illustrates the maximum likelihood waveform and the competitive waveform corresponding to the maximum likelihood path and the competitive path in FIG. 10. In an inter-signal distance calculation unit 810, a PR characteristic such as PR (1, 2, 2, 2, 1) is convolved in the maximum likelihood decoded value and the competitive decoded value in the inter-signal distance calculation unit 810 to generate the maximum likelihood waveform and the competitive waveform, and an inter-waveform Euclidean distance is calculated.

Figure 12:
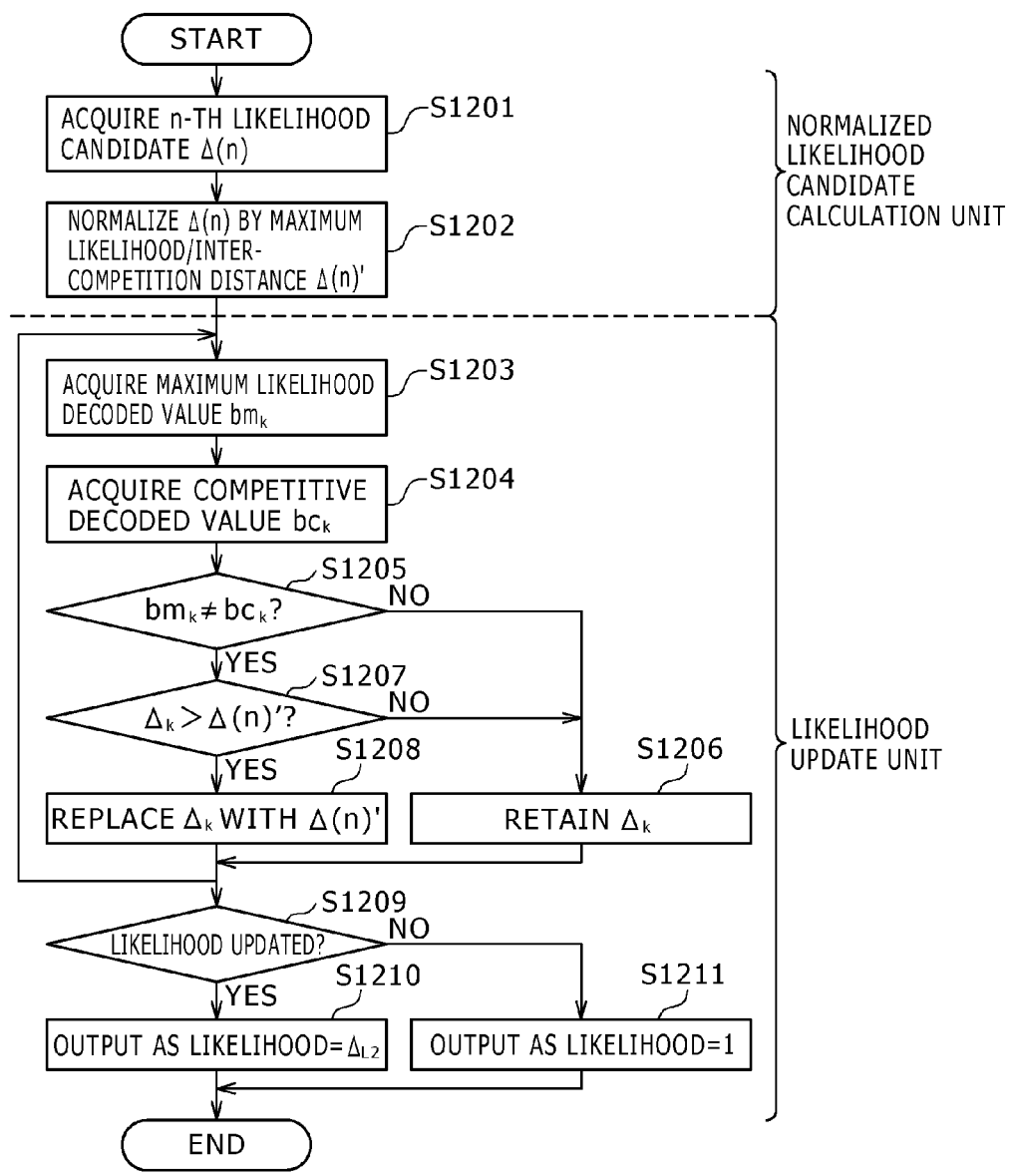
FIG. 12 is a flowchart illustrating a likelihood updating procedure according to the first embodiment of the present invention.

The subsequent likelihood calculation method will be described with reference to a flowchart of FIG. 12.

First, in a normalized likelihood calculation unit 811, a likelihood candidate Δ of the n-th pixel is acquired from the likelihood candidate memory 803 (S1201). The likelihood candidate A is divided by the inter-waveform Euclidean distance which is an output of the inter-signal distance calculation unit 810 to calculate the normalized likelihood candidate Δ' (S1202). In a likelihood updating unit 812, a k-th ($1 \leq k \leq L2$) maximum likelihood decoded value bm is acquired from the maximum likelihood decoded value memory 808, and a k-th ($1 \leq k \leq L2$) competitive decoded value bc is acquired from the competitive decoded value memory 809 (S1204) to compare the maximum likelihood decoded value bm and the competitive decoded value bc (S1205). If the comparison result in S1205 is identical, the k-th likelihood stored in the likelihood memory 813 is retained as it is (S1206). If not identical, the k-th likelihood Δk stored in the likelihood memory 813 is compared with a normalized likelihood candidate Δ' (S1207). As a comparison result in S1207, if the normalized likelihood candidate Δ' is smaller, the k-th likelihood stored in the likelihood memory 813 is replaced with Δ' (S1208) (for example, Δ5 in FIG. 10). If the normalized likelihood candidate Δ' is larger, the k-th likelihood stored in the likelihood memory 813 is retained as it is (S1206) (for example, Δ8 in FIG. 10). The processing from S1203 to S1208 is implemented from k=1 to L2 and it is confirmed whether S1207 is executed during this process, or not (S1209). If S1207 is executed, an L2-th likelihood ΔL2 in the likelihood memory 813 is output as the likelihood (S1210). If S1207 is not executed, since the likelihood is not updated at all, the likelihood is output as 1 (S1211). This corresponds to the provision of a mean value of the distribution illustrated in FIG. 7 because the normalized likelihood is used.

An LLR calculation unit 814 calculates the likelihood LLR calculated in the above according to an LLR calculation expression of Expression 4. A mean value μ and a standard deviation σ in Expression 4 may be measured, but may be preset values. Finally, a multiplication unit 815 outputs a result of multiplying the L2-th maximum likelihood decoded value in the maximum likelihood decoded value memory 808 by the LLR as the reliability to the soft value demodulation unit 506.

According to the above circuit configuration and processing procedure, the effective reliability is calculated in the decoding processing of the hologram, and the soft determination decoding is applied to enable the correction capability to be improved.

In this embodiment, the Euclidean distance is used to calculate the inter-waveform distance, but may be replaced with an absolute value. Also, the (1, 7) RLL is exemplified, but the present invention is not limited to this configuration, and is applicable to an arbitrary modulation system. The same is also applied to the following embodiments.

Second Embodiment

Figure 13:
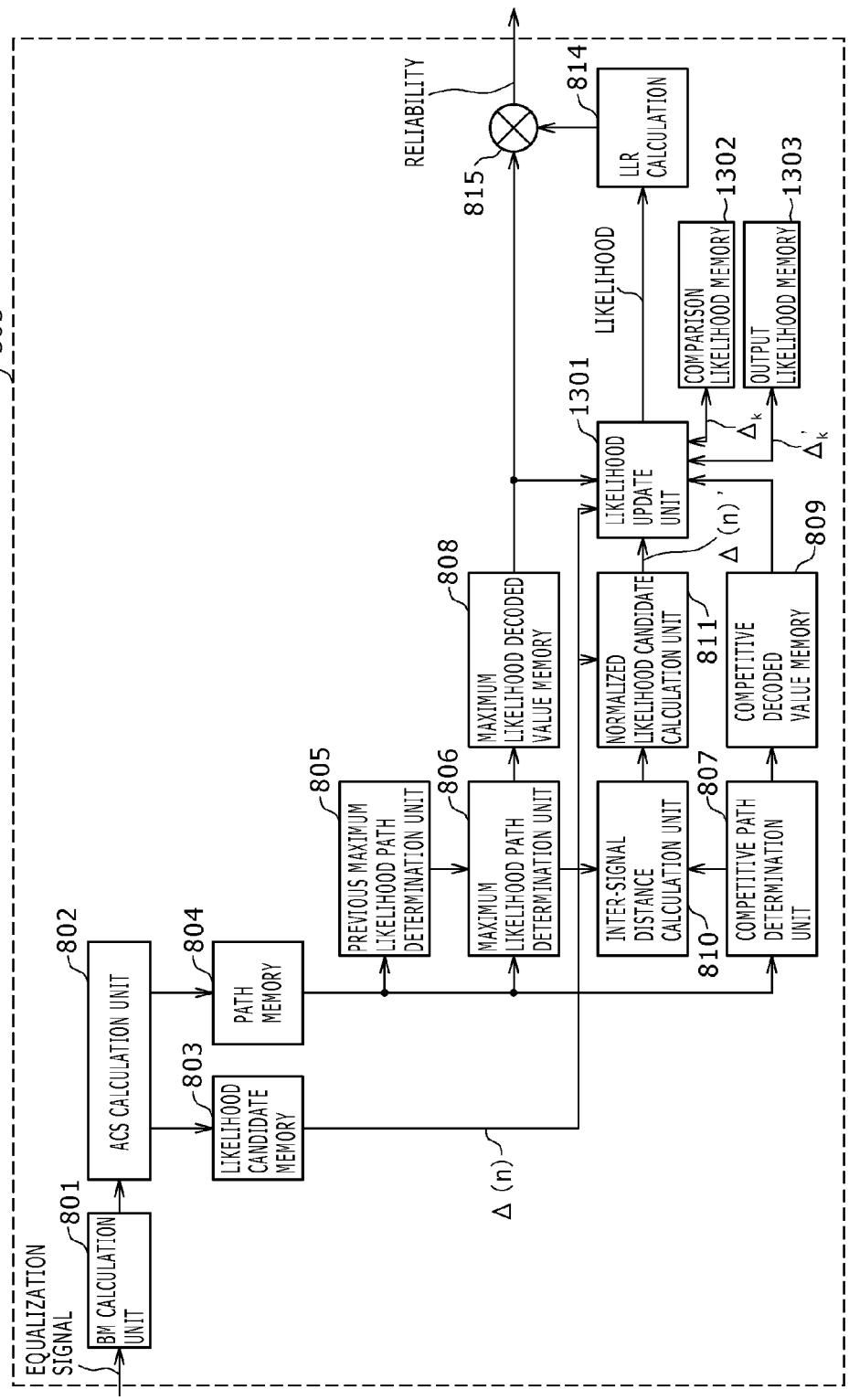
FIG. 13 is a configuration diagram of soft output decoding means according to a second embodiment of the present invention.
Figure 14:
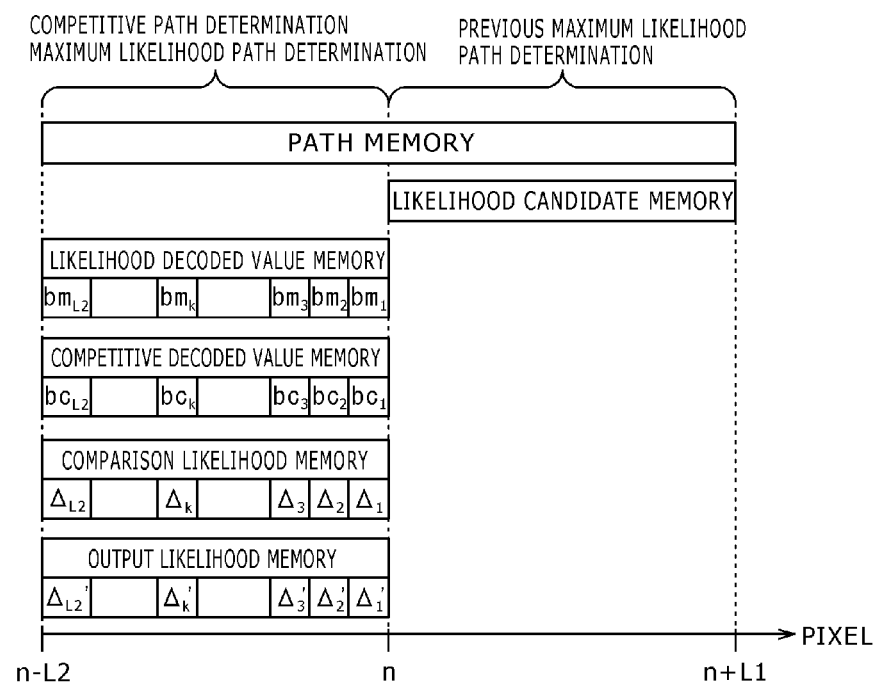
FIG. 14 is a configuration diagram of a memory according to the second embodiment of the present invention.

A difference of this embodiment from the first embodiment resides in that the likelihood not normalized is used for updating the likelihood. FIG. 13 illustrates a configuration of the soft output decoding unit 505 in this embodiment. A difference from the first embodiment resides in the likelihood updating unit 812 and the likelihood memory 813 in FIG. 8, and corresponding components are a likelihood updating unit 1301, a comparison likelihood memory 1302, and an output likelihood memory 1303 in FIG. 13. A configuration of the comparison likelihood memory 1302 and the output likelihood memory 1303 is illustrated in FIG. 14.

Figure 15:
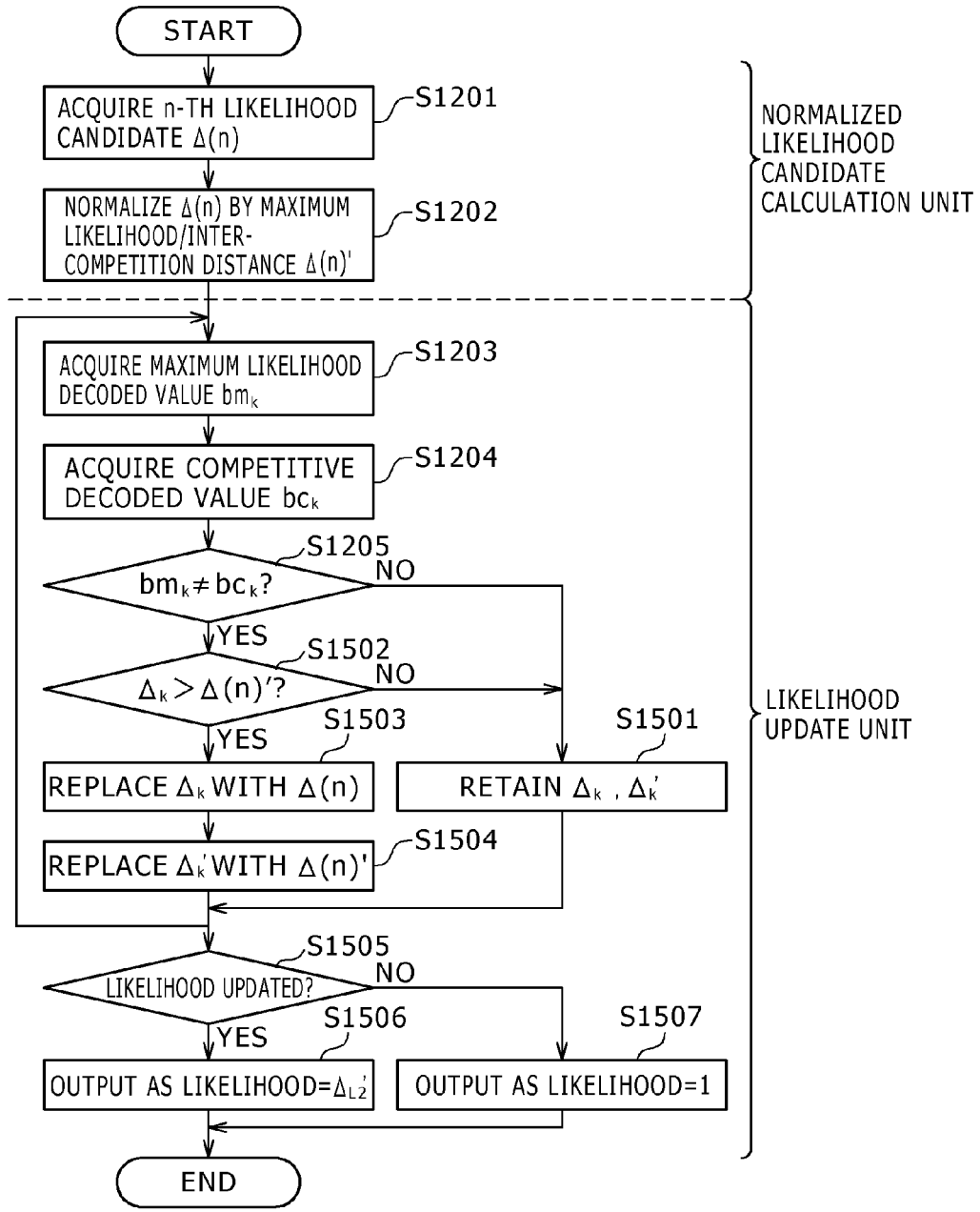
FIG. 15 is a flowchart illustrating a likelihood updating procedure according to the second embodiment of the present invention.

Now, the operation of the likelihood updating unit 1301 in FIG. 13 will be described with reference to a flowchart of FIG. 15.

The operation to S1205 is identical with that in the first embodiment, and if the comparison result in S1205 is identical, the k-th likelihood stored in the comparison likelihood memory 1302 and the output likelihood memory 1303 is retained as it is (S1501). If the comparison result is not identical, the k-th likelihood Δk stored in the comparison likelihood memory 1302 is compared with the likelihood candidate Δ (S1502). As a comparison result in S1502, if the likelihood candidate Δ is smaller, the k-th likelihood stored in the comparison likelihood memory 1302 is replaced with the likelihood candidate Δ (S1503), and the k-th likelihood stored in the output likelihood memory 1303 is replaced with the normalized likelihood candidate Δ' (S1504). Also, as the comparison result in S1502, if the likelihood candidate Δ is larger, the k-th likelihood stored in the comparison likelihood memory 1302 and the output likelihood memory 1303 is retained as I is (S1501). The processing from S1203 to S1504 is implemented from k=1 to L2 and it is confirmed whether S1502 is executed during this process, or not (S1505). If S1502 is executed, an L2-th likelihood ΔL2' in the output likelihood memory 1303 is output as the likelihood (S1506). If S1502 is not executed, since the likelihood is not updated at all, the likelihood is output as 1 (S1507). This corresponds to the provision of a mean value of the distribution illustrated in FIG. 7 because the normalized likelihood is used.

According to the above circuit configuration and processing procedure, the likelihood before the normalization can be used for comparison of the likelihood updating, and the likelihood after the normalization can be used as the actual output. The effective reliability is calculated in the decoding processing of the hologram, and the correction capability can be improved by application of the soft determination decoding.

Third Embodiment

Figure 16:
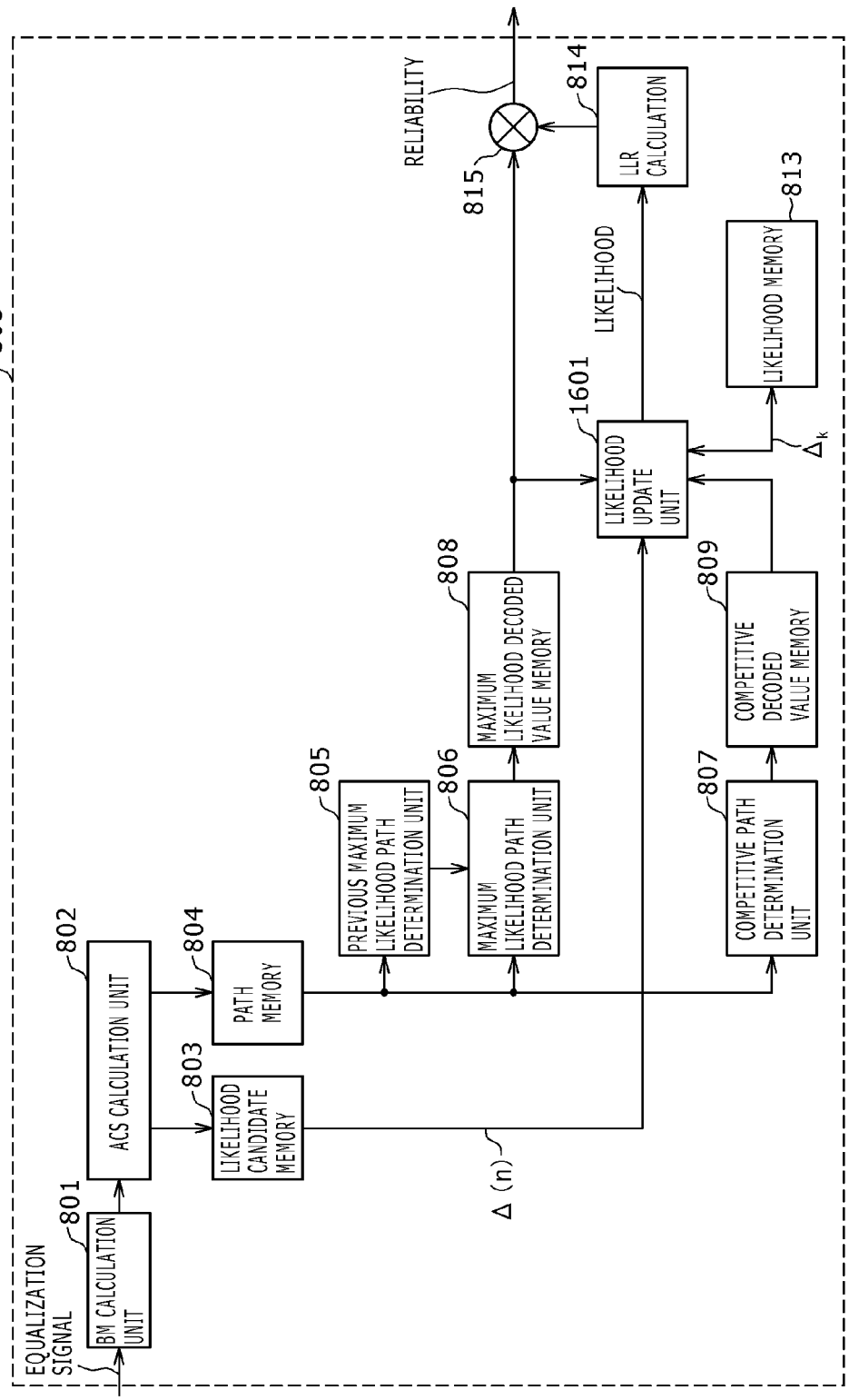
FIG. 16 is a configuration diagram of soft output decoding means according to a third embodiment of the present invention.

A difference of this embodiment from the first embodiment resides in that the likelihood not normalized is also used for updating and outputting the likelihood. FIG. 16 illustrates a configuration of the soft output decoding unit 505 according to this embodiment. A difference from the first embodiment resides in the likelihood updating unit 812, and a corresponding component is a likelihood updating unit 1601 in FIG. 16. The inter-signal distance calculation unit 810 and the normalized likelihood calculation unit 811 in FIG. 8 are not necessary.

Figure 17:
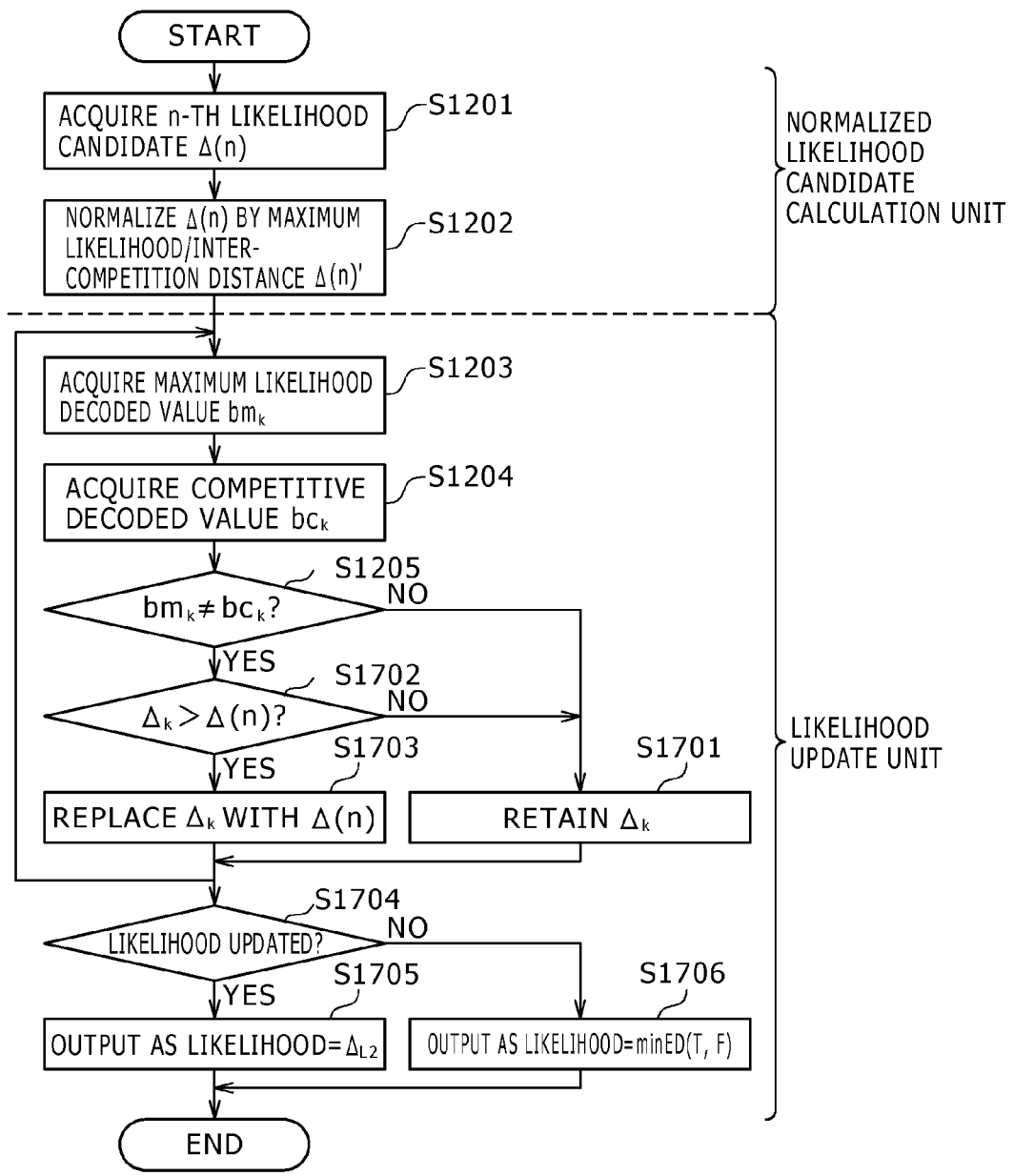
FIG. 17 is a flowchart illustrating a likelihood updating procedure according to the third embodiment of the present invention.

Now, the operation of the likelihood updating unit 1601 in FIG. 16 will be described with reference to a flowchart of FIG. 17.

Figure 18:
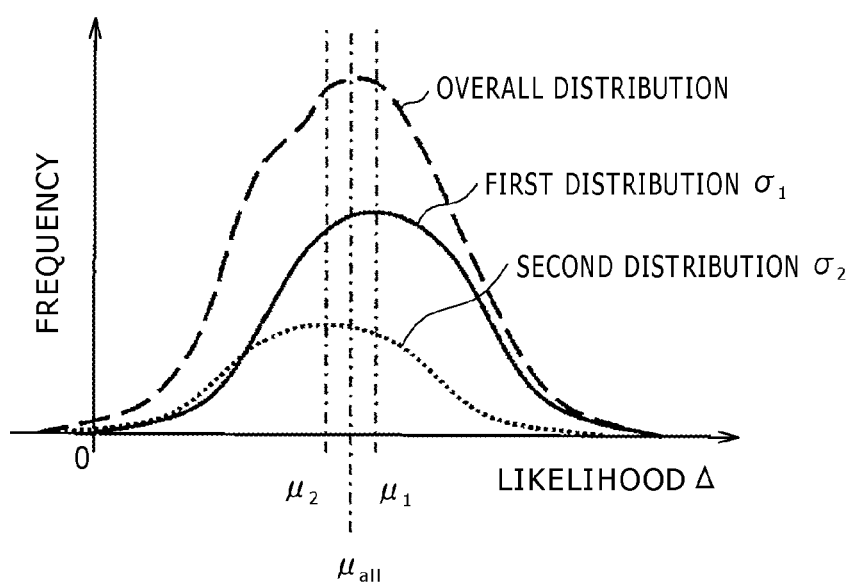
FIG. 18 is a diagram illustrating likelihood distributions of respective patterns, and a likelihood distribution combining those likelihood distributions together.

The operation to S1205 is identical with that in the first embodiment, and if the comparison result in S1205 is identical, the k-th likelihood stored in the likelihood memory 813 is retained as it is (S1701). If the comparison result is not identical, the k-th likelihood Δk stored in the likelihood memory 813 is compared with the likelihood candidate Δ (S1702). As a comparison result in S1702, if the likelihood candidate Δ is smaller, the k-th likelihood stored in the likelihood memory 813 is replaced with the likelihood candidate Δ (S1703), and if the likelihood candidate Δ is larger, the k-th likelihood stored in the likelihood memory 813 is retained as it is (S1701). The processing from S1203 to S1703 is implemented from k=1 to L2, and it is confirmed whether S1702 is executed during this process, or not (S1704). If S1702 is executed, an L2-th likelihood ΔL2 in the likelihood memory 813 is output as the likelihood (S1705). If S1702 is not executed, since the likelihood is not updated at all, the likelihood in which the inter-waveform Euclidean distance of the maximum likelihood waveform and the competitive waveform is shortest is output (S1706). This corresponds to the provision of a mean value (μ2 in FIG. 18) of the distribution of the path that is most liable to be in error among the distribution. Also, as the likelihood output in S1706, a mean value (μall) of the overall distribution in FIG. 18 may be used.

According to the above circuit configuration and processing procedure, the appropriate likelihood can be output even when the likelihood not normalized is used, the effective reliability is calculated in the decoding processing of the hologram, and the correction capability can be improved by application of the soft determination decoding.

Fourth Embodiment

A difference of this embodiment from the first embodiment resides in the operation of the competitive path determination. In the first embodiment, after the previous maximum likelihood path determination has been implemented, the maximum likelihood path and the competitive path are determined. On the contrary, in this embodiment, the previous maximum likelihood path determination is not conducted.

Figure 19:
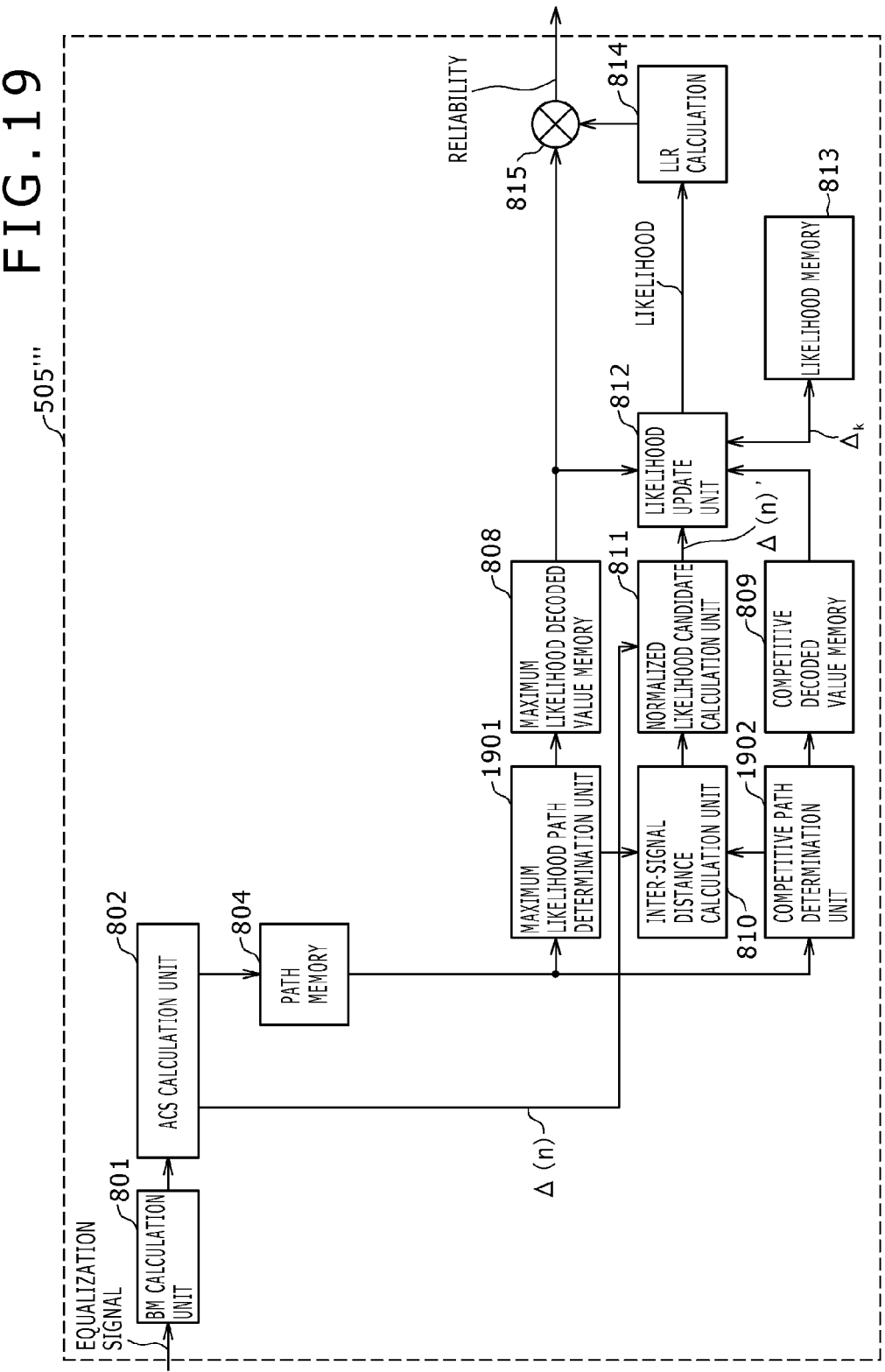
FIG. 19 is a configuration diagram of soft output decoding means according to a fourth embodiment of the present invention.

FIG. 19 illustrates a configuration of the soft output decoding unit 505 according to this embodiment. A difference from the first embodiment resides in the maximum likelihood path determination unit 806 and the competitive path determination unit 807 in FIG. 8, and corresponding components are a maximum likelihood path determination unit 1901 and the competitive path determination unit 1902 in FIG. 19. The likelihood candidate memory 803 and the previous maximum likelihood path determination unit 805 in FIG. 8 are not necessary.

Figure 20:
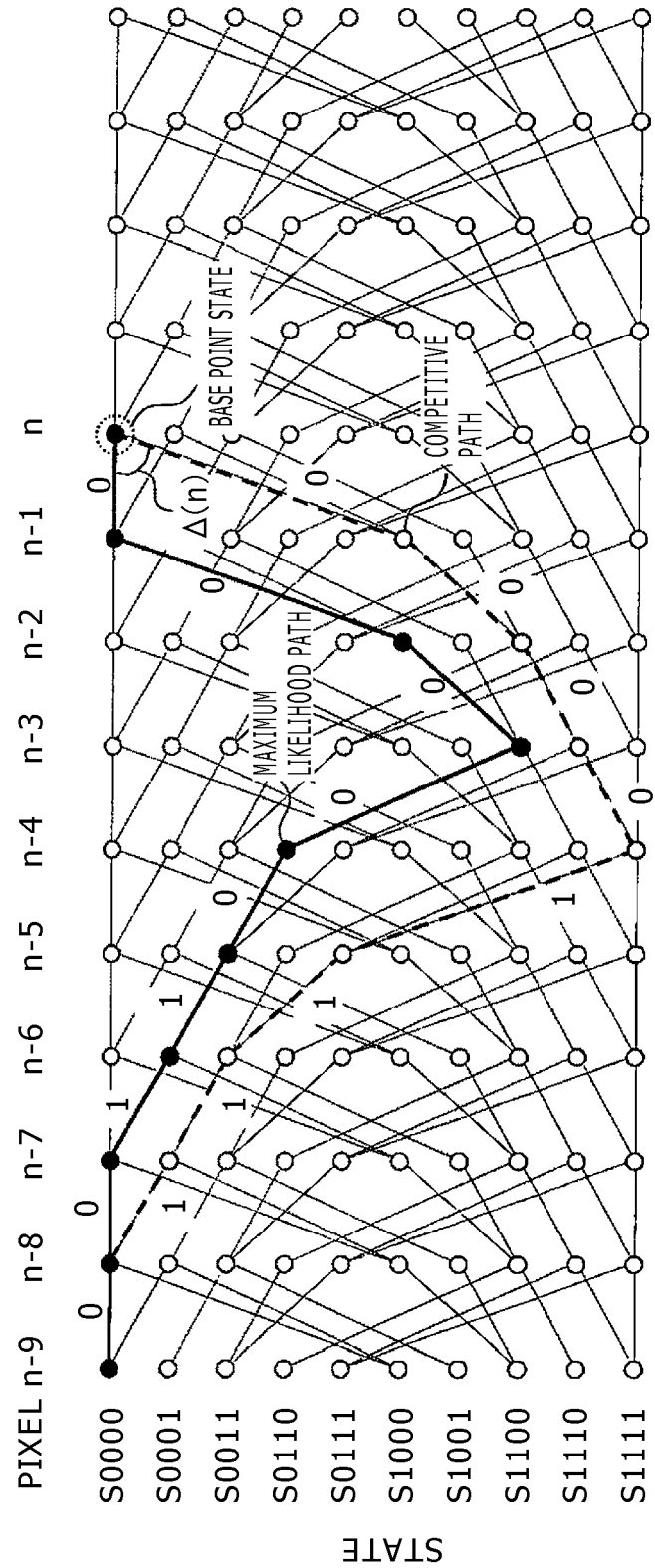
FIG. 20 is a trellis diagram illustrating soft output decoding according to the fourth embodiment of the present invention.

An example of the n-th pixel periphery in the path determination method will be described with reference to FIG. 20. First, it is assumed that a state in which the path metric of the n-th pixel is smallest is a base point state. Then, in the maximum likelihood path determination unit 1901, the n-th pixel to an (n−L2)-th pixel are traced back as usual to determine the maximum likelihood path with the base point state of the n-th pixel as a start point. Also, in the competitive path determination unit 1902, a path different from the path stored in the path memory 804 for only the transition to the (n−1)-th pixel is selected with the base point state of the n-th pixel as the start point, and thereafter the (n−1)-th pixel to the (n−L2)-th pixel are traced back as usual to determine the competitive path.

Alternatively, the following method may be applied to the determination of the competitive path.

Figure 21:
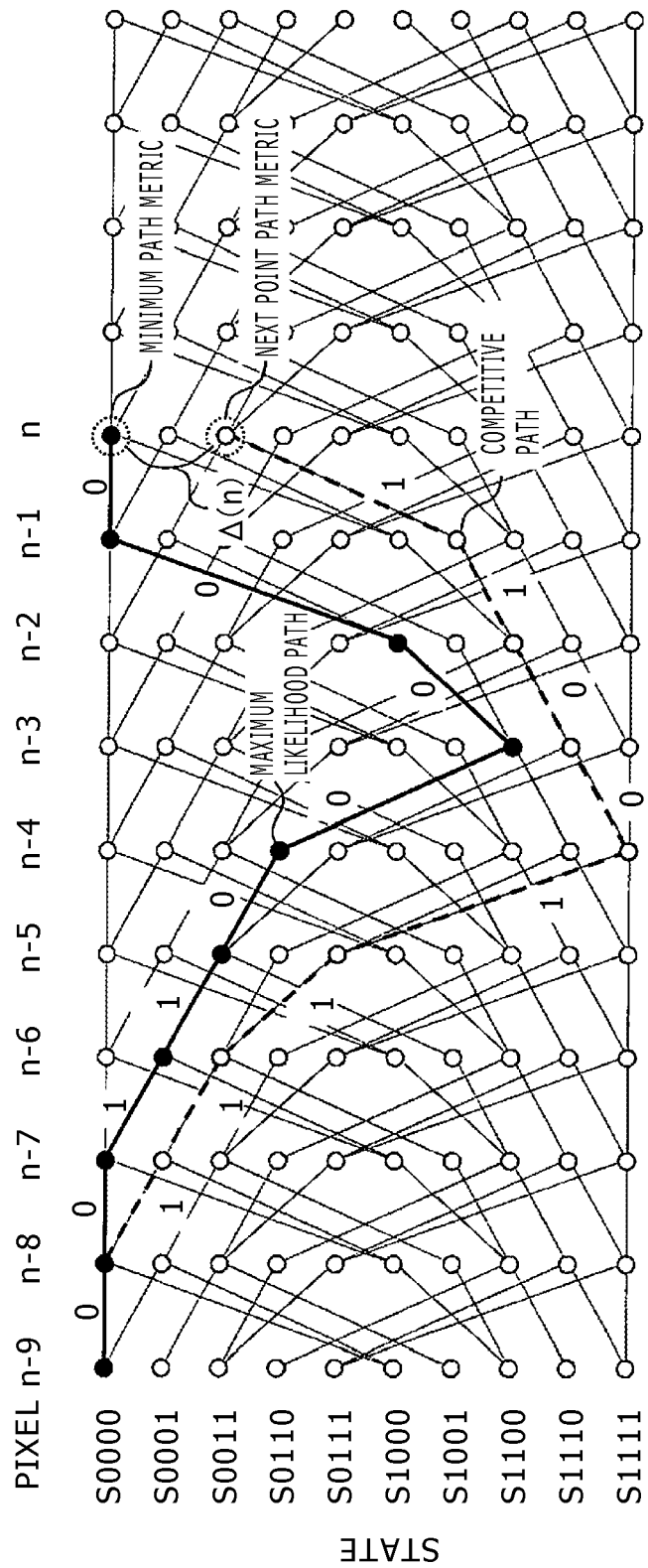
FIG. 21 is a trellis diagram illustrating the soft output decoding according to the fourth embodiment of the present invention.

An example of the n-th pixel periphery in the path determination method will be described with reference to FIG. 21. A trellis diagram of FIG. 21 develops the state transition diagram of FIG. 22. In the maximum likelihood path determination unit 1901, the n-th pixel to the (n−L2)-th pixel are traced back as usual to determine the maximum likelihood path with a state which is the minimum path metric of the n-th pixel as a start point. Also, in the competitive path determination unit 1902, the n-th pixel to the (n−L2)-th pixel are traced back as usual to determine the competitive path with a state in which the path metric of the n-th pixel is a second smallest next-point path metric as a start point. In this case, the likelihood candidate Δ is a difference between the minimum path metric and the next-point path metric as illustrated in FIG. 21.

According to the above circuit configuration and processing procedure, the effective reliability is calculated in the decoding processing of the hologram, and the correction capability can be improved by application of the soft determination decoding. Further, the amount of memory can be reduced.

This embodiment is described with application to the first embodiment. However, the same can be applied to other embodiments.

Fifth Embodiment

In the above embodiments, one dimension is applied. However, in this embodiment, an example of two dimensions will be described. A difference from the first embodiment resides in a calculation method of the likelihood candidate Δ.

Figure 26:
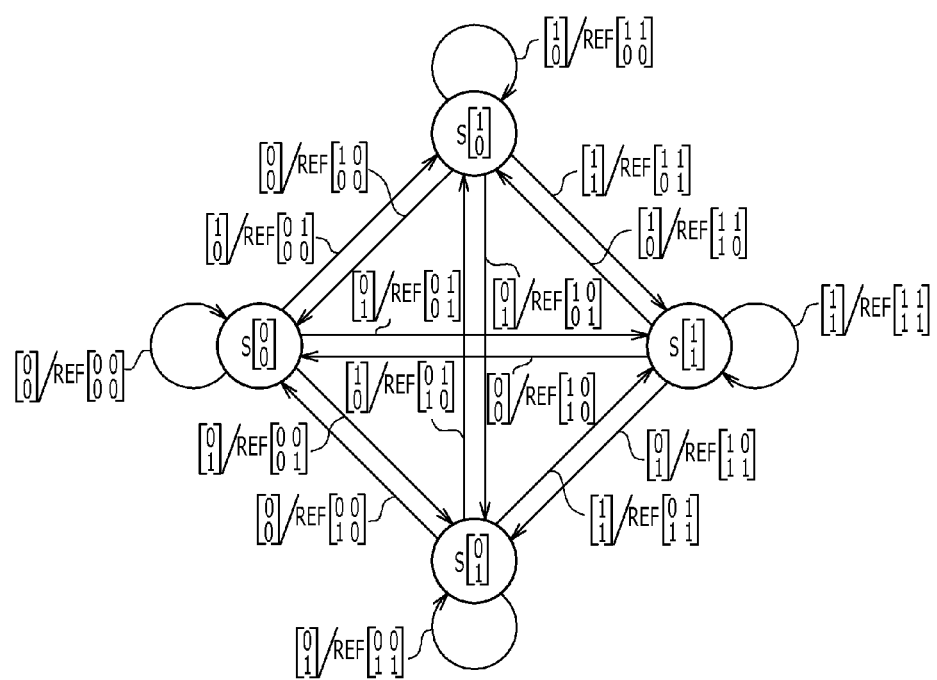
FIG. 26 is a state transition diagram of a Viterbi algorithm using PR (a, b; c, d).

An example of the n-th pixel periphery in the calculation method of the likelihood candidate Δ will be described with reference to FIGS. 26 and 27. FIG. 26 illustrates a state transition diagram of a two-dimensional PR characteristic of a 2×2 matrix represented by Expression 8. Symbols a, b, c, and d are arbitrary real numbers. The two-dimensional PR characteristic to be used is not limited to this configuration, but the present invention can be also expanded to an arbitrary matrix.

$$PR\begin{bmatrix} a & b \\ c & d \end{bmatrix}$$ [EX. 8]

First, the BM calculation unit 801 calculates a branch metric which is a square of a difference between reference values REF[00; 00] to REF[11; 11] in FIG. 26 and an equalized waveform which is an input of the soft output decoding unit 505. Thereafter, the ACS calculation unit 802 adds the branch metric to a path metric for each of states S[0; 0] to S[1; 1] in FIG. 26, and compares addition results with each other at a point where the paths of FIG. 26 join together. Since four paths join together as illustrated in FIG. 26, a path smallest in the addition result is selected from those four paths.

A trellis diagram of FIG. 27 develops the state transition diagram of FIG. 26, and a confluence of the paths at S[0; 0] of the n-th pixel will be exemplified. In the ACS calculation unit 802, differences (Δ1, Δ2, Δ3) of the addition result between the selected path and the other paths are calculated, and a smallest one of Δ1, Δ2, and Δ3 is determined as a path most liable to be in error, and stored in the likelihood candidate memory 803 as the likelihood candidate Δ. In FIG. 27, 41 is smallest.

Also, in the competitive path determination unit 807, a path different from the path stored in the path memory 804 for only the transition to the (n−1)-th pixel is selected with the base point state of the n-th pixel as the start point. It is assumed that the different path is a path used when calculating the likelihood candidate Δ. In FIG. 27, the path of Δ1 is the competitive path.

Further, in the likelihood updating unit 812, a k-th (1≤k≤L2) maximum likelihood decoded value bm is acquired from the maximum likelihood decoded value memory 808, and a k-th (1≤k≤L2) competitive decoded value bc is acquired from the competitive decoded value memory 809 (S1204). In the example of Expression 8, as illustrated in FIG. 26, because two bits are decoded at the same time, the maximum likelihood decoded value bm and the competitive decoded value bc are signals of two bits. Hence, when the maximum likelihood decoded value bm and the competitive decoded value bc are compared with each other (S1205), the comparison is implemented between 0-bit and 1 bit. Hereinafter, the updating of the likelihood is implemented on the respective 0 bit and 1 bit.

According to the above circuit configuration and processing procedure, the effective reliability is calculated in the decoding processing of the hologram, and the correction capability can be improved by application of the soft determination decoding.

Also, this embodiment is described with application to the first embodiment. However, the same can be applied to other embodiments.

Further, the above embodiments are described for the angle-multiplexing recording system. However, the present invention is not limited to this configuration, but is also applicable to another recording system such as a shift multiplexing system.

LIST OF REFERENCE SIGNS

1: optical information recording medium, 10: optical information recording/reproducing apparatus, 11: pickup, 12: phase conjugate optical system, 13: disc cure optical system, 14: disc rotation angle detection optical system, 50: rotary motor, 81: access control circuit, 82: light source driver circuit, 83: servo signal generator circuit, 84: servo control circuit, 85: signal processor circuit, 86: signal generator circuit, 87: shutter control circuit, 88: disc rotary motor control circuit, 89: controller, 201: light source, 202: collimator lens, 203: shutter, 204: optical element, 205: polarization beam splitter, 206: signal light, 207: polarization beam splitter, 208: spatial optical modulator, 209: beam expander, 210: relay lens, 211: phase (phase) mask, 212: relay lens, 213: spatial filter, 214: mirror, 215: mirror, 216: mirror, 217: actuator, 218: photodetector, 219: lens, 220: lens, 221: mirror, 222: actuator, 223: reference light, 224: polarization direction conversion element, 225: objective lens, 401: sectoring unit, 402: header addition unit, 403: scramble unit, 404: error correction encoding unit, 405: modulation unit, 406: two-dimensional encoding unit, 407: synchronization signal addition unit, 01: synchronization signal detection unit, 502: image strain correction unit, 503: resampling unit, 504: image equalization unit, 505: soft output decoding unit, 506: soft value demodulation unit, 507: error correction unit, 508: header detection unit, 509: sector detection unit, 510: descramble unit, 801: BM calculation unit, 802: ACS calculation unit, 803: likelihood candidate memory 803, 804: path memory unit, 805: previous maximum likelihood path determination unit, 806: maximum likelihood path determination unit, 807: competitive path determination unit, 808: maximum likelihood decoded value memory, 809: competitive decoded value memory, 810: inter-signal distance calculation unit, 811: normalized likelihood calculation unit, 812: likelihood updating unit, 813: likelihood memory, 814: LLR calculation unit, 815: multiplication unit, 1301: likelihood updating unit, 1302: comparison likelihood memory, 1303: output likelihood memory, 1601: likelihood updating unit, 1901: maximum likelihood path determination unit, and 1902: competitive path determination unit

The invention claimed is:

1. An optical information reproducing apparatus that reproduces information with the use of holography, comprising:
   an image acquisition unit that acquires two-dimensional data from a hologram disc;
   a maximum likelihood path determination unit that outputs a maximum likelihood path which is a maximum likelihood decoded result of n-th pixel of the two-dimensional data;
   a competitive path determination unit that outputs a competitive path which is a decoded result different from the maximum likelihood path of the n-th pixel;
   a likelihood calculation unit that outputs a likelihood which is a difference between the maximum likelihood path of the n-th pixel and the competitive path of the n-th pixel;
   an inter-signal distance calculation unit that outputs an inter-signal distance which is a distance between a maximum likelihood waveform generated according to the decoded result of the maximum likelihood path of the n-th pixel, and a competitive waveform generated according to the decoded result of the competitive path of the n-th pixel;
   a normalized likelihood calculation unit that outputs a normalized likelihood obtained by normalizing the likelihood of the n-th pixel by the inter-signal distance of the n-th pixel;
   a reliability output unit that outputs a reliability on the basis of the likelihood candidate; and
   an error correction unit that conducts an error correction of data on the basis of the output of the reliability output unit.

2. The optical information reproducing apparatus according to claim 1, further comprising:
   a likelihood updating unit that compares likelihood candidates of pixels different in the decoded result of the maximum likelihood path and the decoded result of the competitive path with the normalized likelihood, and sets the normalized likelihood as the likelihood candidate if the normalized likelihood is smaller,
   wherein the reliability output unit outputs a reliability on the basis of the likelihood candidate.

3. The optical information reproducing apparatus according to claim 1, further comprising:
   a likelihood updating unit that compares likelihood candidates of pixels different in the decoded result of the maximum likelihood path and the decoded result of the competitive path with the likelihood, and sets the likelihood as the likelihood candidate if the likelihood is smaller,
   wherein the normalized likelihood calculation unit outputs a normalized likelihood candidate obtained by normalizing the likelihood candidate by the inter-signal distance, and
   the reliability output unit outputs a reliability on the basis of the normalized likelihood candidate.

4. An optical information reproducing method of reproducing information with the use of holography, comprising:
   acquiring two-dimensional data from a hologram disc;
   a maximum likelihood path determination step of outputting a maximum likelihood path which is a maximum likelihood decoded result of n-th pixel of the two-dimensional data;

a competitive path determination step of outputting a competitive path which is a decoded result different from the maximum likelihood path of the n-th pixel;

a likelihood calculation step of outputting a likelihood which is a difference between the maximum likelihood path of the n-th pixel and the competitive path of the n-th pixel;

an inter-signal distance calculation step of outputting an inter-signal distance which is a distance between a maximum likelihood waveform generated according to the decoded result of the maximum likelihood path of the n-th pixel, and a competitive waveform generated according to the decoded result of the competitive path of the n-th pixel;

a normalized likelihood calculation step of outputting a normalized likelihood obtained by normalizing the likelihood of the n-th pixel by the inter-signal distance of the n-th pixel;

a reliability output step of outputting a reliability on the basis of the likelihood candidate; and an error correction step of conducting an error correction of data on the basis of output of the reliability output step.

5. The optical information reproducing method according to claim 4, further comprising:

a likelihood updating step of comparing likelihood candidates of pixels different in the decoded result of the maximum likelihood path and the decoded result of the competitive path with the normalized likelihood, and setting the normalized likelihood as the likelihood candidate if the normalized likelihood is smaller, wherein a reliability is set on the basis of the likelihood candidate in the reliability output step.

6. The optical information reproducing method according to claim 4, further comprising:

a likelihood updating step of comparing likelihood candidates of pixels different in the decoded result of the maximum likelihood path and the decoded result of the competitive path with the likelihood, and setting the likelihood as the likelihood candidate if the likelihood is smaller, wherein a normalized likelihood candidate obtained by normalizing the likelihood candidate by the inter-signal distance is output in the normalized likelihood calculation step; and a reliability is set on the basis of the normalized likelihood candidate in the reliability output step.

* * * * *